United States Patent
Masuko

(10) Patent No.: US 9,489,361 B2
(45) Date of Patent: Nov. 8, 2016

(54) IMAGE PROCESSING DEVICE, IMAGE PROCESSING DEVICE CONTROL METHOD, PROGRAM, AND INFORMATION STORAGE MEDIUM

(75) Inventor: Soh Masuko, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 250 days.

(21) Appl. No.: 14/397,201

(22) PCT Filed: Apr. 27, 2012

(86) PCT No.: PCT/JP2012/061494
§ 371 (c)(1),
(2), (4) Date: Oct. 27, 2014

(87) PCT Pub. No.: WO2013/161086
PCT Pub. Date: Oct. 31, 2013

(65) Prior Publication Data
US 2015/0149875 A1  May 28, 2015

(51) Int. Cl.
G06K 9/00 (2006.01)
G06F 17/24 (2006.01)
G06T 11/60 (2006.01)
G06F 17/21 (2006.01)

(52) U.S. Cl.
CPC .......... *G06F 17/241* (2013.01); *G06F 17/212* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 9,418,292 B2 * | 8/2016 | Murphy | G06T 19/006 |
| 2011/0115807 A1 * | 5/2011 | Kim | G09G 5/00 345/589 |
| 2013/0182002 A1 * | 7/2013 | Macciola | H04N 1/387 345/589 |
| 2014/0198234 A1 * | 7/2014 | Kobayashi | H04N 1/2129 348/231.99 |
| 2015/0149883 A1 * | 5/2015 | Masuko | G06T 11/00 715/232 |
| 2015/0254801 A1 * | 9/2015 | Hasegawa | G06K 9/00 345/660 |
| 2015/0356774 A1 * | 12/2015 | Gal | G06F 17/50 345/633 |

FOREIGN PATENT DOCUMENTS

| | | |
|---|---|---|
| JP | H04-310997 A | 11/1992 |
| JP | 2004-289706 A | 10/2004 |

OTHER PUBLICATIONS

International Search Report for PCT/JP2012/061494 dated Jul. 24, 2012.

* cited by examiner

*Primary Examiner* — Wesley Tucker
(74) *Attorney, Agent, or Firm* — Hubbs, Enatsky & Inoue PLLC

(57) ABSTRACT

Provided is an image processing device capable of executing a determination of a display position of annotation information in consideration of a characteristic part of a target image without having a person designate a characteristic part of the target image or a part other than a characteristic part of the target image. An area setting unit sets a plurality of areas within a target image. A calculation unit calculates, as to each of the plurality of areas, a total value of edge amounts of the pixels within the area. An annotation information display area determination unit determines a display area of annotation information, based on the total value of each of the plurality of areas. A data output unit outputs data on the target image with the annotation information displayed in the display area determined by the annotation information display area determination unit.

21 Claims, 18 Drawing Sheets

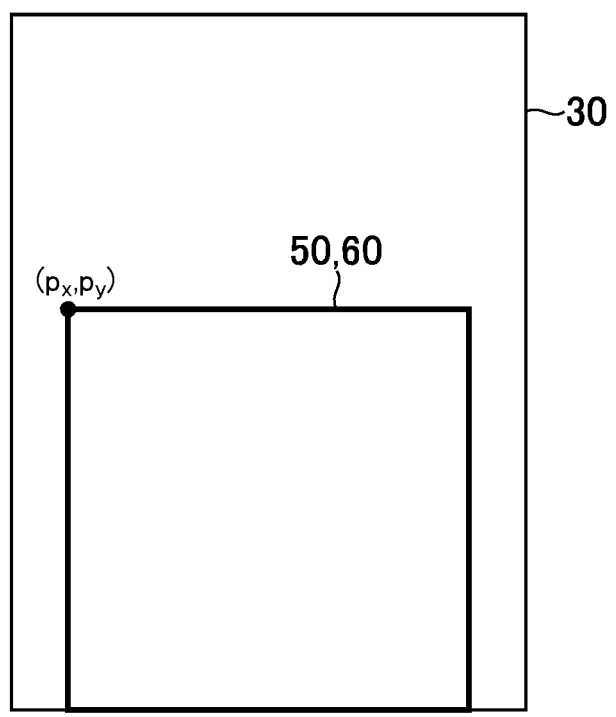

| UPPERMOST AND LEFTMOST PIXEL OF DISPLAY AREA CANDIDATE | EVALUATION VALUE E |
|---|---|
| (0, 0) | — — — |
| (0, 1) | — — — |
| ... | ... |

FIG.18

| DISPLAY AREA DETERMINATION PROCESSING | EDGE AMOUNT | EVALUATION VALUE CALCULATION METHOD |
|---|---|---|
| FIRST DISPLAY AREA DETERMINATION PROCESSING | COLOR PHASE | EXPRESSION (6) |
| SECOND DISPLAY AREA DETERMINATION PROCESSING | COLOR PHASE | EXPRESSION (9) |
| THIRD DISPLAY AREA DETERMINATION PROCESSING | COLOR PHASE | EXPRESSIONS (16) AND (17) |
| FOURTH DISPLAY AREA DETERMINATION PROCESSING | COLOR PHASE | EXPRESSION (20) |
| FIFTH DISPLAY AREA DETERMINATION PROCESSING | BRIGHTNESS | EXPRESSION (6) |
| SIXTH DISPLAY AREA DETERMINATION PROCESSING | BRIGHTNESS | EXPRESSION (9) |
| SEVENTH DISPLAY AREA DETERMINATION PROCESSING | BRIGHTNESS | EXPRESSIONS (16) AND (17) |
| EIGHTH DISPLAY AREA DETERMINATION PROCESSING | BRIGHTNESS | EXPRESSION (20) |

FIG.19

| EDGE AMOUNT DISTRIBUTION PATTERN INFORMATION | DISPLAY AREA DETERMINATION PROCESSING |
|---|---|
| FIRST DISTRIBUTION PATTERN INFORMATION | FIRST DISPLAY AREA DETERMINATION PROCESSING |
| SECOND DISTRIBUTION PATTERN INFORMATION | SECOND DISPLAY AREA DETERMINATION PROCESSING |
| THIRD DISTRIBUTION PATTERN INFORMATION | THIRD DISPLAY AREA DETERMINATION PROCESSING |
| FOURTH DISTRIBUTION PATTERN INFORMATION | FOURTH DISPLAY AREA DETERMINATION PROCESSING |
| FIFTH DISTRIBUTION PATTERN INFORMATION | FIFTH DISPLAY AREA DETERMINATION PROCESSING |
| SIXTH DISTRIBUTION PATTERN INFORMATION | SIXTH DISPLAY AREA DETERMINATION PROCESSING |
| SEVENTH DISTRIBUTION PATTERN INFORMATION | SEVENTH DISPLAY AREA DETERMINATION PROCESSING |
| EIGHTH DISTRIBUTION PATTERN INFORMATION | EIGHTH DISPLAY AREA DETERMINATION PROCESSING |

FIG.22

| EDGE AMOUNT DISTRIBUTION PATTERN INFORMATION | DISPLAY AREA SELECTION RESULT INFORMATION (NUMBER OF TIMES DISPLAY AREA IS SELECTED) | | | | | | | |
|---|---|---|---|---|---|---|---|---|
| | 1 | 2 | 3 | 4 | 5 | 6 | 7 | 8 |
| FIRST DISTRIBUTION PATTERN INFORMATION | 50 | 12 | 8 | 10 | 14 | 2 | 11 | 9 |
| SECOND DISTRIBUTION PATTERN INFORMATION | 5 | 60 | 18 | 20 | 5 | 11 | 17 | 8 |
| THIRD DISTRIBUTION PATTERN INFORMATION | 12 | 20 | 41 | 17 | 15 | 15 | 20 | 13 |
| FOURTH DISTRIBUTION PATTERN INFORMATION | 25 | 10 | 10 | 53 | 10 | 16 | 19 | 20 |
| FIFTH DISTRIBUTION PATTERN INFORMATION | 16 | 21 | 25 | 14 | 61 | 11 | 15 | 21 |
| SIXTH DISTRIBUTION PATTERN INFORMATION | 18 | 12 | 12 | 23 | 22 | 48 | 26 | 19 |
| SEVENTH DISTRIBUTION PATTERN INFORMATION | 13 | 16 | 19 | 27 | 27 | 10 | 22 | 53 |
| EIGHTH DISTRIBUTION PATTERN INFORMATION | 24 | 15 | 18 | 13 | 18 | 26 | 47 | 27 |

IMAGE PROCESSING DEVICE, IMAGE PROCESSING DEVICE CONTROL METHOD, PROGRAM, AND INFORMATION STORAGE MEDIUM

CROSS REFERENCE TO RELATED APPLICATIONS

This application is a National Stage of International Application No. PCT/JP2012/061494 filed Apr. 27, 2012, the content of which is incorporated herein by reference in its entirety.

TECHNICAL FIELD

The present invention relates to an image processing device, an image processing device control method, a program, and an information storage medium.

BACKGROUND ART

There has been known an image processing device that displays annotation information associated with an image in the image. In the image processing device, for example, it is desirable to set a display area of the annotation information in a part other than a characteristic part of the image so that the characteristic part of the image is not hidden by the annotation information and to set a display area of the annotation information in a position near the characteristic part of the image so that association between the annotation information and the characteristic part of the image can be readily understood.

In order to achieve the above, it is necessary to specify a characteristic part of the image or a part other than a characteristic part of the image. As a method for specifying a characteristic part of an image or a part other than a characteristic part of an image, a conventional image processing device employs a method that requests a user to designate a characteristic part of an image or a part other than a characteristic part of an image. According to an image processing device in Patent Literature 1, for example, a user is requested to select a characteristic part of an image (a key object).

CITATION LIST

Patent Literature

Patent Literature 1: JP 2004-289706 A

SUMMARY OF INVENTION

Technical Problem

In a conventional image processing device, a characteristic part of an image or a part other than a characteristic part of an image needs to be designated by a person. According to the technique described in Patent Literature 1, for example, a person needs to select a key object.

The present invention has been conceived in view of the above described problem, and aims to provide an image processing device, an image processing device control method, a program, and an information storage medium capable of determining a display position of annotation information in consideration of a characteristic part of a target image without having a person designate a characteristic part of the target image or a part of the target image other than a characteristic part.

Solution to Problem

In order to achieve the above described object, an image processing device according to the present invention is an image processing device including area setting means for setting a plurality of areas within a target image; calculation means for calculating, as to each of the plurality of areas, a total value of edge amounts of pixels within the area; annotation information display area determination means for determining a display area of annotation information, based on the total value of each of the plurality of areas; and data output means for outputting data on the target image with the annotation information displayed in the display area determined by the annotation information display area determination means.

An image processing device control method according to the present invention is an image processing device control method including an area setting step of setting a plurality of areas within a target image; a calculation step of calculating, as to each of the plurality of areas, a total value of edge amounts of pixels within the area; an annotation information display area determination step of determining a display area of annotation information, based on the total value of each of the plurality of areas; and a data output step of outputting data on the target image with annotation information displayed in the display area determined at the annotation information display area determination step.

A program according to the present invention is a program for causing a computer to function as area setting means for setting a plurality of areas within a target image; a calculation means for calculating, as to each of the plurality of areas, a total value of edge amounts of pixels within the area; annotation information display area determination means for determining a display area of annotation information, based on the total value of each of the plurality of areas; and data output means for outputting data on the target image with the annotation information displayed in the display area determined by the annotation information display area determination means.

An information storage medium according to the present invention is a computer readable information storage medium storing a program for causing a computer to function as area setting means for setting a plurality of areas within a target image; calculation means for calculating, as to each of the plurality of areas, a total value of edge amounts of pixels within the area; annotation information display area determination means for determining a display area of annotation information, based on the total value of each of the plurality of areas; and data output means for outputting data on the target image with the annotation information displayed in the display area determined by the annotation information display area determination means.

In one embodiment of the present invention, the area setting means may include a first area setting means for setting, within the target image, a plurality of first areas for specifying a characteristic area of the target image, the calculation means may include first calculation means for calculating, as to each of the plurality of first areas, a total value of edge amounts of pixels in the first area, the image processing device may include characteristic area detection means for specifying the characteristic area, based on the total value of each of the plurality of first areas, the area setting means may further include a second area setting means for setting, within the target image, a plurality of second areas for determining the display area of the annotation information, the calculation means may further include second calculation means for calculating, as to each of the plurality of second areas, a total value of edge amounts of pixels in the second area, and the annotation information display area determination means may determine the display area of the annotation information, based on the total value of each of the plurality of second areas and the characteristic area.

In one embodiment of the present invention, the annotation information display area determination means may determine one of the second are, which are positioned outside the characteristic area, to be the display area of the annotation information, based on the total value of each of the plurality of second areas positioned outside the characteristic area.

In one embodiment of the present invention, the annotation information display area determination means may determine a second area, which has a smallest total value among the second areas positioned outside the characteristic area, to be the display area of the annotation information.

In one embodiment of the present invention, the annotation information display area determination means may determine one of the second areas, which are positioned outside the characteristic area and have a total value less than a reference value, to be the display area of the annotation information.

In one embodiment of the present invention, the annotation information display area determination means may determine one of the second areas, which are positioned within the characteristic area, to be the display area of the annotation information, based on the total values of the second areas positioned within the characteristic area.

In one embodiment of the present invention, the annotation information display area determination means may determine a second area, which has a smallest total value among the second areas positioned within the characteristic area, to be the display area of the annotation information.

In one embodiment of the present invention, the annotation information display area determination means may determine one of the second areas, which are positioned within the characteristic area and have a total value less than a reference value, to be the display area of the annotation information.

In one embodiment of the present invention, the data output means may include means for obtaining a cropped image obtained by cropping the characteristic area, and a means for outputting data on the trimming area with the annotation information displayed in the display area determined by the annotation information display area determination means.

In one embodiment of the present invention, the annotation information display area determination means may determine the display area of the annotation information, based on the total value of each of the plurality of second areas and a distance between the second area and a representative point or a boundary of the characteristic area.

In one embodiment of the present invention, the annotation information display area determination means may determine a second area, which has a shortest distance among a subset of the second areas whose total value is less than a reference value, to be the display area of the annotation information.

In one embodiment of the present invention, the annotation information display area determination means may determine one of the second areas, which have a total value less than a reference value and a distance shorter than a reference distance, to be the display area of the annotation information.

In one embodiment of the present invention, the annotation information display area determination means may determine the display area of the annotation information, based on the total value of each of the plurality of second areas, the characteristic area, and a combination of color information of the second area and display color information of the annotation information.

In one embodiment of the present invention, the image processing device may further include means for calculating, as to each of the plurality of second areas, a divided value or a multiplicative inverse thereof, the divided value being obtained by dividing the total value of the second area by a total value of edge amounts of pixels in at least one boundary portion of the second area, and the annotation information display area determination means may determine the display area of the annotation information, based on the divided value of each of the plurality of second areas or the multiplicative inverse thereof and the characteristic area.

In one embodiment of the present invention, the second calculation means may calculate a weighted total value of the edge amounts of the pixels in the second area as the total value of the edge amounts of the pixels in the second area, and the second calculation means may set a weight for an edge amount of a pixel in a middle portion of the second area higher than a weight for an edge amount of a pixel in a boundary portion of the second area.

In one embodiment of the present invention, the annotation information display area determination means may determine an area, which has a smallest total value among the plurality of areas, to be the display area of the annotation information.

In one embodiment of the present invention, the annotation information display area determination means may determine one of areas, which have a total value less than a reference value among the plurality of areas, to be the display area of the annotation information.

In one embodiment of the present invention, the image processing device may further include characteristic area detection means for specifying a characteristic area, based on the total value of each of the plurality of areas, and the annotation information display area determination means may set the display area of the annotation information outside the characteristic area.

In one embodiment of the present invention, the image processing device may further include a means for calculating, as to each of the plurality of areas, a divided value or a multiplicative inverse thereof, the divided value being obtained by dividing the total value of the area by a total value of edge amounts of pixels in at least one boundary portion of the area, and the annotation information display area determination means may determine the display area of the annotation information, based on the divided value of each of the plurality of areas or the multiplicative inverse thereof.

In one embodiment of the present invention, the calculation means may calculate a weighted total value of the edge amounts of the pixels within the area as the total value of the edge amounts of the pixel within the area, and the calculation means may set a weight for an edge amount of a pixel in a middle portion of the area higher than a weight for an edge amount of a pixel in a boundary portion of the area.

In one embodiment of the present invention, the edge amount may be an amount relevant to a difference in brightness between a pixel and a pixel located around the pixel.

In one embodiment of the present invention, the edge amount may be an amount relevant to a difference in color phase between a pixel and a pixel located around the pixel.

In one embodiment of the present invention, the image processing device may further include means for storing association data obtained by associating distribution pattern information concerning the distribution pattern of an edge amount of an image with each of a plurality of kinds of display area determination processing for determining the display area of the annotation information, and the annotation information display area determination means may execute determination of the display area of the annotation information based on the total value of each of the plurality of areas, through display area determination processing associated with the distribution pattern of an edge amount of the target image.

In one embodiment of the present invention, the calculation means may include means for calculating, as to each of the plurality of areas, a total value of first edge amounts of the pixels within the area as a first total value, and means for calculating, as to each of the plurality of areas, a total value of second edge amounts of the pixels within the area as a second total value, the first edge amount may be an amount relevant to a difference in color phase between a pixel and a pixel located around the pixel, the second edge amount may be an amount relevant to a difference in brightness between a pixel and a pixel located around the pixel, and the plurality of kinds of display area determination processing may include display area determination processing for determining the display area of the annotation information, based on the first total value of each of the plurality of areas, and display area determination processing for determining the display area of the annotation information, based on the second total value of each of the plurality of areas.

In one embodiment of the present invention, the area setting means may move an area vertically and/or horizontally within the target image to thereby set the plurality of areas.

Advantageous Effects of Invention

According to the present invention, it is possible to execute a determination of a display position of annotation information in consideration of a characteristic part of a target image without having a person designate a characteristic part or a part other than the characteristic part of the target image.

BRIEF DESCRIPTION OF DRAWINGS

FIG. 8 explains a characteristic area detection unit;

FIG. 18 explains a plurality of kinds of display area determination processing;

FIG. 19 shows one example of display area determination processing data;

FIG. 22 shows one example of selection result data; and

DESCRIPTION OF EMBODIMENTS

In the following, examples of embodiments of the present invention will be described in detail based on the drawings.

Figure 1:
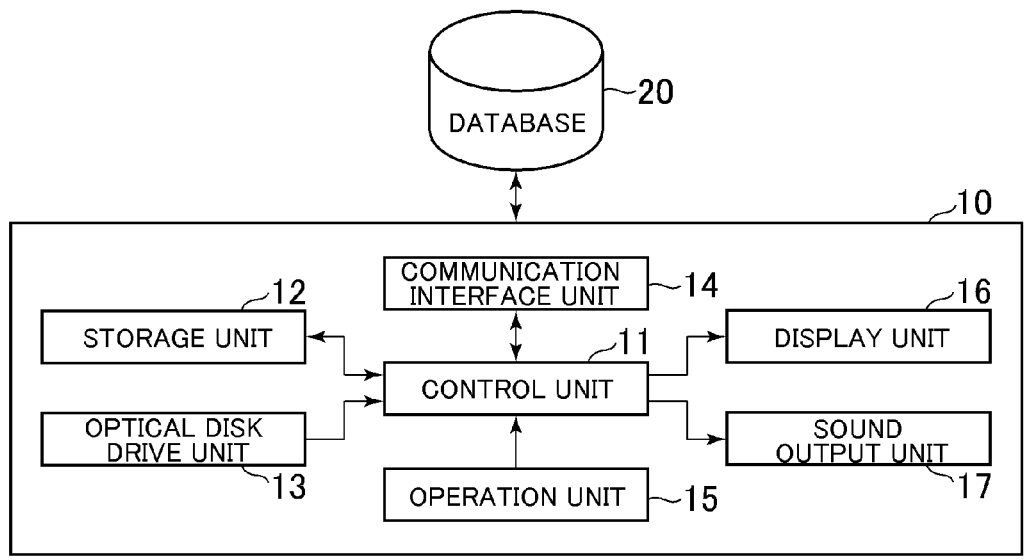
FIG. 1 shows one example of a hardware structure of an image processing device according to an embodiment of the present invention.

[First Embodiment] Initially, a first embodiment of the present invention will be described. An image processing device according to the first embodiment of the present invention is implemented using, for example, a desk top computer, a lap top computer, a tablet computer, a server computer, or the like. FIG. 1 shows one example of a hardware structure of an image processing device 10 according to the first embodiment.

As shown in FIG. 1, the image processing device 10 includes a control unit 11, a storage unit 12, an optical disk drive unit 13, a communication interface unit 14, an operation unit 15, a display unit 16, and a sound output unit 17.

The control unit 11 includes, for example, one or more microprocessors, and executes information processing according to an operating system or a program stored in the storage unit 12. The storage unit 12 includes, for example, a RAM, a hard disk, or a solid state drive. The optical disk drive unit 13 reads a program and data stored in an optical disk (an information storage medium).

A program and data are supplied to the storage unit 12 via an optical disk. That is, an optical disk that records a program and data is mounted in the optical disk drive unit 13, and the program and data are read from the optical disk by the optical disk drive unit 13 to be stored in the storage unit 12. The optical disk drive unit 13, however, is not an indispensable structural element. A structural element for reading a program or data recorded in an information storage medium other than an optical disk (for example, a memory card) may be included instead of the optical disk drive unit 13. In this case, a program and data may be supplied to the storage unit 12 via an information storage medium other than an optical disk.

The communication interface unit 14 is an interface for connecting the image processing device 10 to a communication network. The image processing device 10 can exchange data with other devices (for example, a server or the like) via the communication network. A program and data may be supplied to the storage unit 12 via the communication network.

The operation unit 15 is for operation by a user. For example, a keyboard, a touch pad, a mouse, a touch panel, a stick (a lever), or the like corresponds to the operation unit 15. The display unit 16 is, for example, a liquid crystal display or the like, and the sound output unit 17 is, for example, a speaker, a headphone terminal, or the like.

The image processing device 10 can access a database 20. The database 20 may be implemented in a device (for example, a server) other than the image processing device 10 and may be implemented in the image processing device 10.

An image is stored in the database 20. For example, an image published by a service provided by a web server (not shown) is stored in the database 20. For example, when a service for publishing an image posted by a poster is provided, an image posted by a poster is stored in the database 20.

Figure 2:
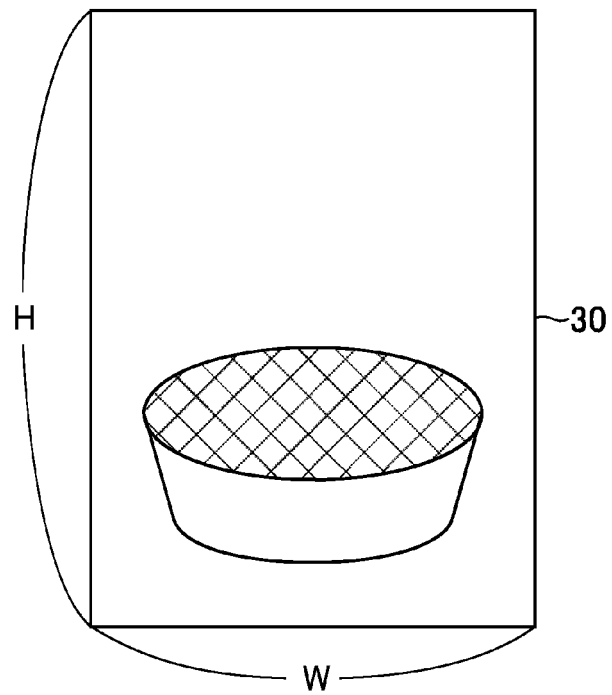
FIG. 2 shows one example of a food image.

In the following, a description will be made based on an assumption that a food image posted by a poster is stored in the database 20. FIG. 2 shows one example of a food image stored in the database 20. The food image 30 shown in FIG. 2 is a vertically long image, which has a height (the number of pixels along a vertical side) longer than the width (the number of pixel along a horizontal side). Note that a horizontally long image, which has a width longer than the height, is also stored in the database 20.

Figure 3:
FIG. 3 shows one example of annotation information.

The food image 30 stored in the database 20 has annotation information inputted by a poster, associated therewith. FIG. 3 shows one example of annotation information. Annotation information includes, for example, information, as is shown below:

text information of the annotation;
information indicating the display color of the annotation;
information indicating the display size of the annotation; and
information indicating the direction of writing (either horizontal writing or vertical writing) of the annotation.

Figure 4:
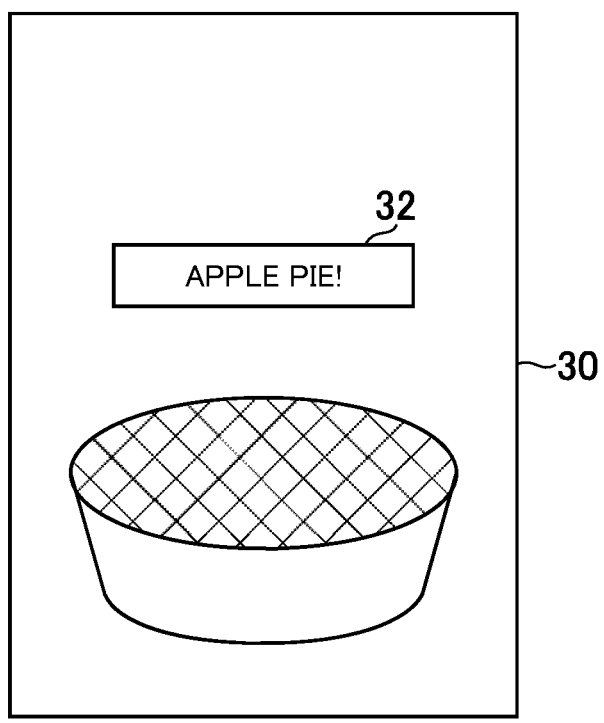
FIG. 4 shows one example of a food image with annotation information displayed therein.

FIG. 4 shows one example of the food image 30 displayed on the display unit 16. As shown in FIG. 4, annotation information 32 is displayed in the food image 30. For example, the display position of the annotation information 32 is set avoiding a characteristic part of the food image 30. In the following, a technique for preferably determining a display position of the annotation information 32 will be described.

Figure 5:
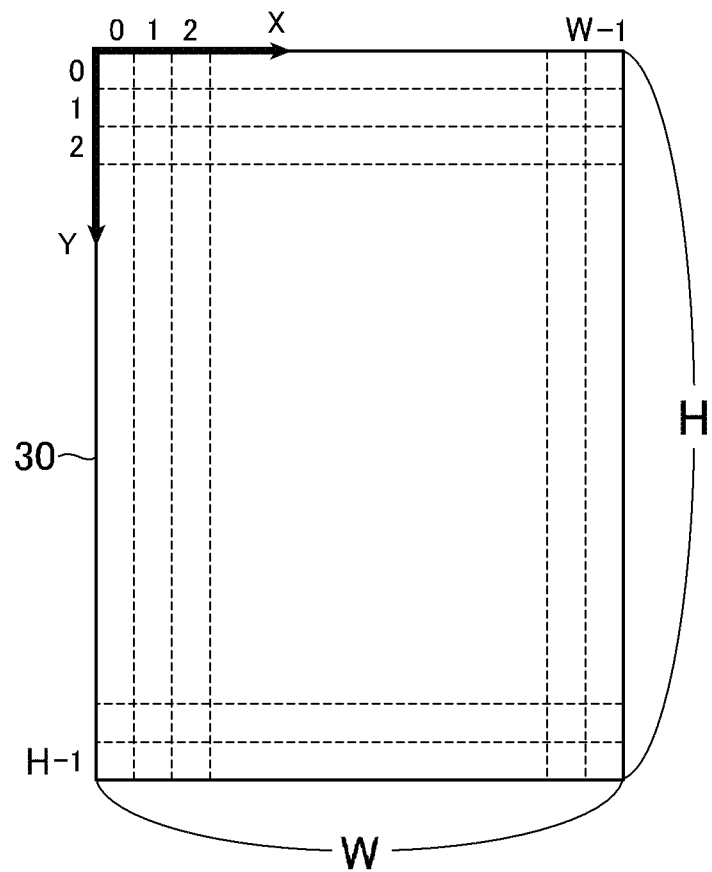
FIG. 5 explains a pixel of the food image.

In the following, as shown in FIG. 5, each pixel of the food image 30 is represented as (x, y) according to a coordinate system in which it is determined that the uppermost and leftmost pixel of the food image 30 is the origin, the rightward direction is the X axis positive direction, and the downward direction is the Y axis positive direction. For example, the uppermost and leftmost pixel of the food image 30 is represented as (0, 0), and the uppermost and rightmost pixel is represented as (W−1, 0). Further, for example, the lowermost and leftmost pixel of the food image 30 is represented as (0, H−1), and the lowermost rightmost pixel is represented as (W−1, H−1). In the above, "H" indicates the height of the food image 30, and "W" indicates the width of the food image 30.

Figure 6:
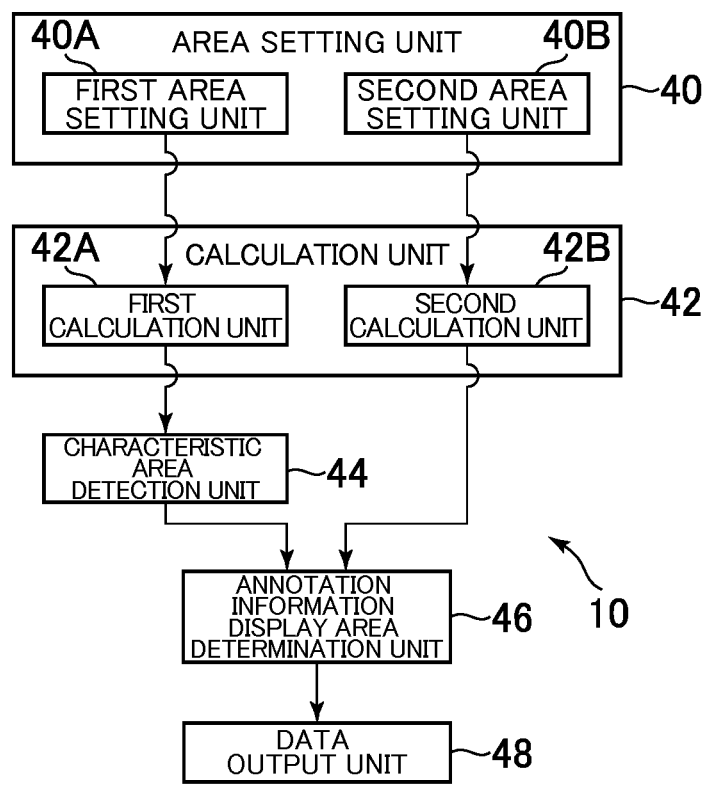
FIG. 6 is a function block diagram of the image processing device.

FIG. 6 is a function block diagram showing function blocks relevant to the present invention among those which are implemented in the image processing device 10 according to the first embodiment. As shown in FIG. 6, the image processing device 10 includes an area setting unit 40, a calculation unit 42, a characteristic area detection unit 44, an annotation information display area determination unit 46, and a data output unit 48.

The area setting unit 40 sets a plurality of areas in a target image. The calculation unit 42 calculates, as to each of the plurality of areas set by the area setting unit 40, the total value of the amounts of edge (or an edge amount) of the pixels in the area. Note here that a "target image" refers to an image to be processed, and a food image 30 posted by a poster corresponds to a "target image" in this embodiment. An "edge amount" will be described later.

The area setting unit 40 includes a first area setting unit 40A, and the calculation unit 42 includes a first calculation unit 42A. The first area setting unit 40A and the first calculation unit 42A are function blocks for the characteristic area detection unit 44. The characteristic area detection unit 44 specifies a characteristic area of the target image. A "characteristic area" refers to an area that attracts the most attention from a person viewing the image, being an area showing an object of interest. In the case of the food image 30, for example, an area showing food corresponds to the "characteristic area".

Below, operations of the first area setting unit 40A, the first calculation unit 42A, and the characteristic area detection unit 44 will be described.

The first area setting unit 40A sets, in the target image, a plurality of first areas for specifying the characteristic area of the target image. For brevity of description, a first area set by the first area setting unit 40A will be hereinafter referred to as a "characteristic area candidate".

Figure 7A:
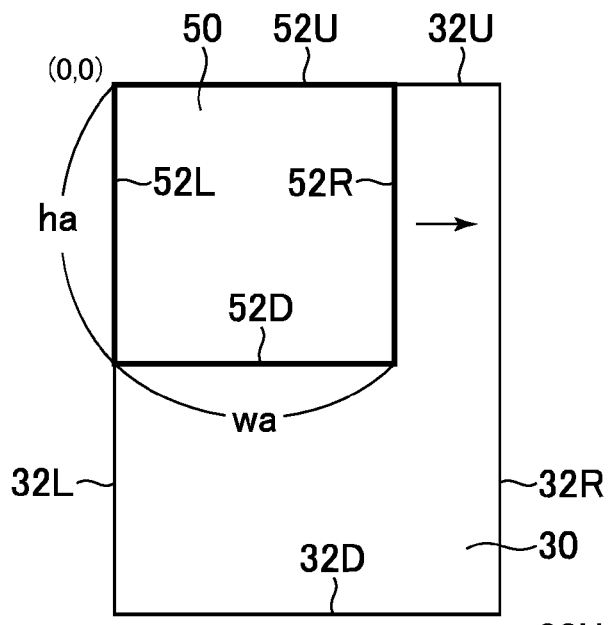
FIGS. 7A, 7B and 7C explain a characteristic area candidate.
Figure 7B:
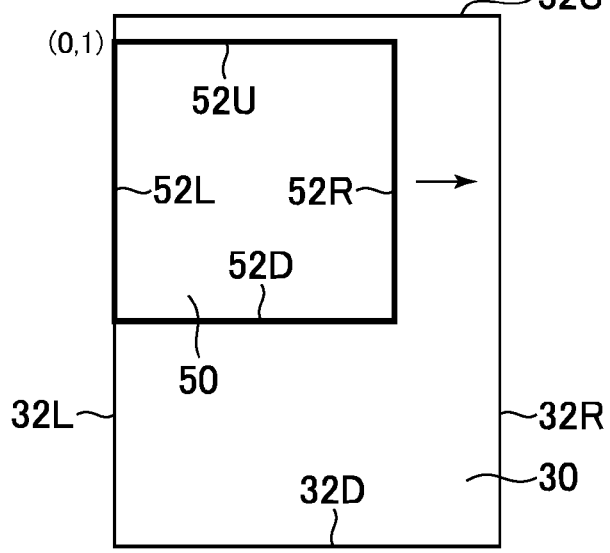
Figure 7C:
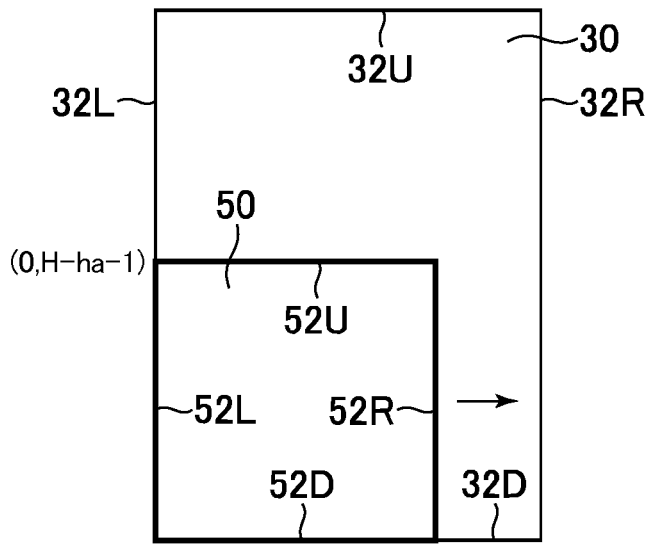

FIGS. 7A, 7B and 7C explain a characteristic area candidate. For example, a characteristic area candidate 50 is a rectangular area or a square area. For example, the size of the characteristic area candidate 50 is set to a predetermined size. That is, the height (ha) and the width (wa) of the characteristic area candidate 50 are set to predetermined lengths.

Alternatively, the size of the characteristic area candidate 50 is set, based on the size of the target image. For example, the height (ha) of the characteristic area candidate 50 is set, based on the height (H) of the target image. Specifically, a predetermined coefficient greater than and less than 1 is multiplied to the height (H) of the target image, and the value thereby obtained is set as the height (ha) of the characteristic area candidate 50. Similarly, the width (wa) of the characteristic area candidate is set, based on the width (W) of the target image. Specifically, a predetermined coefficient greater than 0 and less than 1 is multiplied to the width (W) of the target image, and the value thereby obtained is set as the width (wa) of the characteristic area candidate 50.

Still alternatively, a length equal to the shorter one of the height (H) and the width (W) of the target image may be set as the height (ha) and width (wa) of the characteristic area candidate 50. That is, when the target image is a vertically long image, the height (ha) and width (wa) of the characteristic area candidate 50 may both be set equal in length to the width (W) of the target image, and when the target image is a horizontally long image, the height (ha) and width (wa) of the characteristic area candidate 50 may both be set equal in length to the height (H) of the target image. In these cases, the characteristic area candidate 50 is a square area.

The first area setting unit 40A sets a partial area within the target image (a food image 30) as a characteristic area candidate 50, and then moves the characteristic area candidate 50 vertically and/or horizontally within the target image to thereby determine a plurality of characteristic area candidates 50.

As shown in FIG. 7A, for example, the first area setting unit 40A sets the initial position of the characteristic area candidate 50 such that the uppermost and leftmost pixel of the characteristic area candidate 50 coincides with the uppermost and leftmost pixel (0, 0) of the food image 30. In other words, the first area setting unit 40A sets the initial position of the characteristic area candidate 50 such that the upper boundary 52U of the characteristic area candidate 50 coincides with the upper side 32U of the food image 30 and the left boundary 52L of the characteristic area candidate 50 coincides with the left side 32L of the food image 30. Then, the first area setting unit 40A moves the characteristic area candidate 50 rightward within the food image 30 by one pixel at a time until the right boundary 52R of the characteristic area candidate 50 comes to coincide with the right side 32R of the food image 30.

When the right boundary 52R of the characteristic area candidate 50 comes to coincide with the right side 32R of the food image 30, the first area setting unit 40A then moves the characteristic area candidate 50 downward by one pixel within the food image 30 and sets the characteristic area candidate 50 such that the left boundary 52L of the characteristic area candidate 50 coincides with the left side 32L of the food image 30, as shown in FIG. 7B. In this case, the characteristic area candidate 50 is resultantly set to a position where the uppermost and leftmost pixel of the characteristic area candidate 50 coincides with the pixel (0, 1) of the food image 30. Then, the first area setting unit 40A moves the characteristic area candidate 50 rightward by one pixel at a time within the food image 30 until the right boundary 52R of the characteristic area candidate 50 comes to coincide with the right side 32R of the food image 30.

The first area setting unit 40A repeats the above described processing to finally set the characteristic area candidate 50 to a position where the left boundary 52L of the characteristic area candidate 50 coincides with the left side 32L of the food image 30 and the lower boundary 52D of the characteristic area candidate 50 coincides with the lower side 32D of the food image 30, as shown in FIG. 7C. That is, the characteristic area candidate 50 is set to a position where the uppermost and leftmost pixel of the characteristic area candidate 50 coincides with the uppermost and leftmost pixel (0, H−ha−1) of the food image 30. In this case as well, the first area setting unit 40A then moves the characteristic area candidate 50 rightward by one pixel at a time within the food image 30 until the right boundary 52R of the characteristic area candidate 50 comes to coincide with the right side 32R of the food image 30.

Note that a method for setting the characteristic area candidate 50 is not limited to the above described example. For example, the first area setting unit 40A may set the initial position of the characteristic area candidate 50 such that the lowermost and leftmost pixel of the characteristic area candidate 50 coincides with the lowermost and leftmost pixel (0, H−1) of the food image 30. Alternatively, for example, the first area setting unit 40A may set the initial position of the characteristic area candidate 50 such that the uppermost and rightmost pixel of the characteristic area candidate 50 coincides with the uppermost and rightmost pixel (W−1, 0) of the food image 30.

The first calculation unit 42A calculates, as to each of the plurality of characteristic area candidates 50 set by the first area setting unit 40A, the total value of the edge amounts of the pixels in the characteristic area candidate 50. Here, "edge" refers to an extent of change in color in the target image, and an "edge amount of a pixel" refers to an amount relevant to an extent of difference in color phase between a pixel and one or more pixels located around that pixel.

A publicly known method can be used as a method for calculating an edge amount of a pixel. For example, a Sobel filter can be used. Supposing that the pixel value of a pixel (x, y) is defined as $I_{x,y}$, the edge amount $S_{x,y}$ of the pixel (x, y) is calculated using the expressions (1) to (3) mentioned below.

[Expression 1]

$$S_{x,y\ horz.} = \sum_{i \in \{-1,0,1\}} (I_{x+1,y+i} - I_{x-1,y+i}) \quad (1)$$

$$S_{x,y\ vert.} = \sum_{i \in \{-1,0,1\}} (I_{x+i,y+1} - I_{x+i,y-1}) \quad (2)$$

$$S_{x,y} = \sqrt{S_{x,y\ horz.}^2 + S_{x,y\ vert.}^2} \quad (3)$$

A pixel value I of each pixel is obtained by converting an RGB value of the pixel to a $YC_BC_R$ value. Conversion from an RGB value to a $YC_BC_R$ value is achieved using the expression (4) mentioned below. Here, as an amount relevant to a difference in color phase between a pixel and one or more pixels located around the pixel is used as an "edge amount of a pixel", a pixel value I of each pixel is calculated based on the $C_B$ value and the $C_R$ value of the pixel. For example, a pixel value I of each pixel is calculated using the expression (5) mentioned below.

[Expression 2]

$$\begin{bmatrix} Y \\ C_B \\ C_R \\ 1 \end{bmatrix} = \begin{bmatrix} 65.481 & 128.553 & 24.966 & 16 \\ -37.797 & -74.203 & 112 & 128 \\ 112 & -93.786 & -18.214 & 128 \\ 0 & 0 & 0 & 1 \end{bmatrix} \begin{bmatrix} R \\ G \\ B \\ 1 \end{bmatrix} \quad (4)$$

$$I = \sqrt{C_B^2 + C_R^2} \quad (5)$$

Based on the edge amount S of each pixel of the target image, calculated as described above, the first calculation unit 42A calculates the total value T of the edge amounts S of the pixels within the characteristic area candidate 50. The expression (6) mentioned below is an expression for calculating the total value T. Specifically, the expression (6) mentioned below is an expression for calculating the total value T of a rectangular area or a square area, which has the uppermost and leftmost pixel (i, j), the height h, and the width w. In calculation of the total value T of the edge amounts S of the pixels within the characteristic area candidate 50, which has the uppermost and leftmost pixel (i, j), the first calculation unit 42A substitutes the height (ha) and width (wa) of the characteristic area candidate 50 into "h" and "w" of the expression (6) mentioned below to calculate the total value T.

[Expression 3]

$$T = \sum_{Y=j}^{j+h-1} \sum_{X=i}^{i+w-1} S_{X,Y} \quad (6)$$

The characteristic area detection unit 44 specifies the characteristic area of the target image, based on the total value T of each of the plurality of characteristic area candidate 50. For example, the characteristic area detection unit 44 specifies one of the plurality of characteristic area candidates 50 as the characteristic area, based on the total value T of each of the plurality of characteristic area candidates 50.

FIG. 8 is a diagram explaining the characteristic area detection unit 44. For example, the characteristic area detection unit 44 specifies a characteristic area candidate 50, which has a largest total value T among the plurality of characteristic area candidates 50, as the characteristic area 60. Note that the uppermost and leftmost pixel $(p_x, p_y)$ of a rectangular area or a square area, which has a largest total value T, is given by the expressions (7) and (8) mentioned below.

[Expression 4]

$$p_x = \underset{i}{\mathrm{argmax}} \sum_{Y=j}^{j+h-1} \sum_{X=i}^{i+w-1} S_{X,Y} \quad (7)$$

$$p_y = \underset{j}{\mathrm{argmax}} \sum_{Y=j}^{j+h-1} \sum_{X=i}^{i+w-1} S_{X,Y} \quad (8)$$

With the above, description on operations of the first area setting unit 40A, the first calculation unit 42A, and the characteristic area detection unit 44 is finished.

As shown in FIG. 6, the area setting unit 40 includes a second area setting unit 40B, and the calculation unit 42 includes a second calculation unit 42B. The second area setting unit 40B and the second calculation unit 42B are function blocks for the annotation information display area determination unit 46. The annotation information display area determination unit 46 determines an area to display annotation information.

Operations of the second area setting unit 40B, the second calculation unit 42B, and the annotation information display area determination unit 46 will be described.

The second area setting unit 40B sets, within the target image, a plurality of second areas for determining a display area of annotation information. For brevity of description, a second area set by the second area setting unit 40B will be hereinafter referred to as a "display area candidate".

Figure 9A:
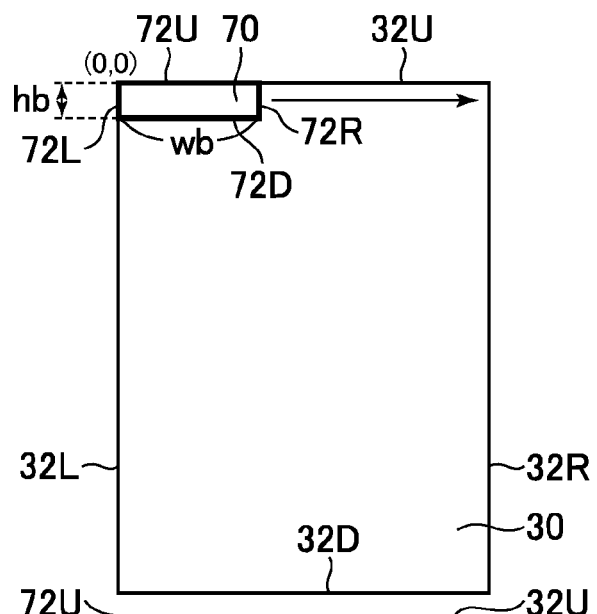
FIGS. 9A, 9B and 9c explain a display area candidate.
Figure 9B:
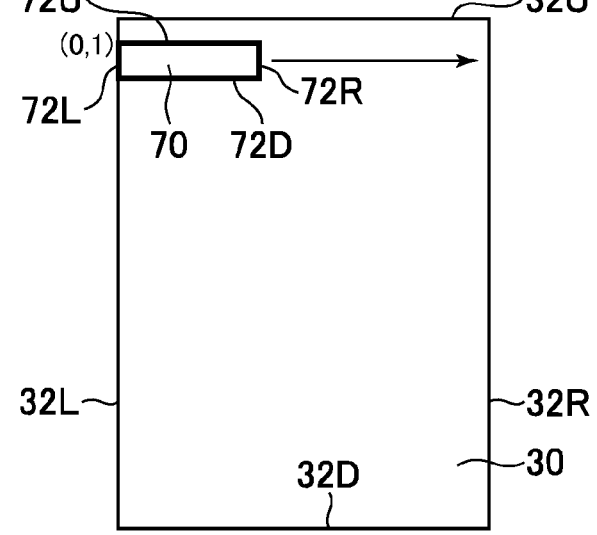
Figure 9C:
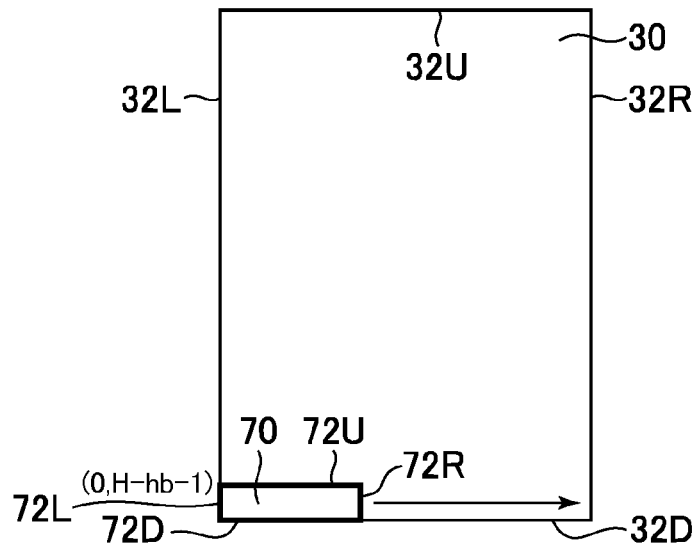

FIGS. 9A, 9B and 9C explain a display area candidate. A display area candidate 70 has a size different from that of the characteristic area candidate 50. Generally, as the size of an area necessary to display annotation information is small, compared to that of the characteristic area of the target image, the display area candidate 70 is set smaller than the characteristic area candidate 50. For example, the display area candidate 70 is a rectangular area or a square area. The size of the display area candidate 70 is set, based on annotation information. That is, the height (hb) and width (wb) of the display area candidate 70 are set, based on the length, the display size, and the direction of writing of an annotation. Alternatively, the size of the display area candidate 70 may be set to a predetermined size.

The display area candidate 70 is set in a manner similar to that for the characteristic area candidate 50. That is, the second area setting unit 40B sets a partial area within the target image (a food image 30) as the display area candidate 70, and then moves the display area candidate 70 vertically and/or horizontally within the target image to thereby set a plurality of display area candidates 70.

As shown in FIG. 9A, for example, the second area setting unit 40B sets the initial position of the display area candidate 70 such that the uppermost and leftmost pixel of the display area candidate 70 coincides with the uppermost and leftmost pixel (0, 0) of the food image 30. Then, the second area setting unit 40B moves the display area candidate 70 rightward within the food image 30 by one pixel at a time until the right boundary 72R of the display area candidate 70 comes to coincide with the right side 32R of the food image 30.

When the right boundary 72R of the display area candidate 70 comes to coincide with the right side 32R of the food image 30, the second area setting unit 40B moves the display area candidate 70 downward by one pixel within the food image 30 and sets the display area candidate 70 such that the left boundary 72L of the display area candidate 70 coincides with the left side 32L of the food image 30, as shown in FIG. 9B. In this case, the display area candidate 70 is resultantly set in a position where the uppermost and leftmost pixel of the display area candidate 70 coincides with the uppermost and leftmost pixel (0, 1) of the food image 30. Then, the second area setting unit 40B moves the display area candidate 70 rightward by one pixel at a time within the food image 30 until the right boundary 72R of the display area candidate 70 comes to coincide with the right side 32R of the food image 30.

The second area setting unit 40B repeats the above described processing. The second area setting unit 40B finally sets the display area candidate 70 in a position where the left boundary 72L of the display area candidate 70 coincides with the left side 32L of the food image 30 and the lower boundary 72D of the display area candidate 70 coincides with the lower side 32D of the food image 30, as shown in FIG. 9C. That is, the display area candidate 70 is set in a position where the uppermost and leftmost pixel of the display area candidate 70 coincides with the uppermost and leftmost pixel (0, H−hb−1) of the food image 30. Then, in this case as well, the second area setting unit 40B moves the display area candidate 70 rightward by one pixel at a time within the food image 30 until the right boundary 72R of the display area candidate 70 comes to coincide with the right side 32R of the food image 30.

Note that a method for setting the display area candidate 70 is not limited to the example described above. For example, the second area setting unit 40B may set the initial position of the display area candidate 70 such that the lowermost and leftmost pixel of the display area candidate 70 coincides with the lowermost and leftmost pixel (0, H−1) of the food image 30. Alternatively, for example, the second area setting unit 40B may set the initial position of the display area candidate 70 such that the uppermost and rightmost pixel of the display area candidate 70 coincides with the uppermost and rightmost pixel (W−1, 0) of the food image 30.

The second calculation unit 42B calculates, as to each of the plurality of display area candidates 70 set by the second area setting unit 40B, the total value of the edge amounts of the pixels in the display area candidate 70. The second calculation unit 42B calculates the total value T of the edge amounts S of the pixels within the display area candidate 70, based on the edge amount S of each pixel of the target image (the food image 30), calculated based on the expressions (1) to (5) mentioned above. The total value T of the display area candidate 70 is calculated in the same manner as for calculating the total value T of the characteristic area candidate 50. That is, the total value T of the display area candidate 70 is calculated using the expression (6) mentioned above.

The annotation information display area determination unit 46 determines a display area of annotation information, based on the total value T of each of the plurality of characteristic area candidates 50 and the total value T of each of the plurality of display area candidate 70. For example, the annotation information display area determination unit 46 determines a display area of annotation information, based on the characteristic area specified by the characteristic area detection unit 44 and the total value T of each of the plurality of display area candidates 70.

Figure 10:
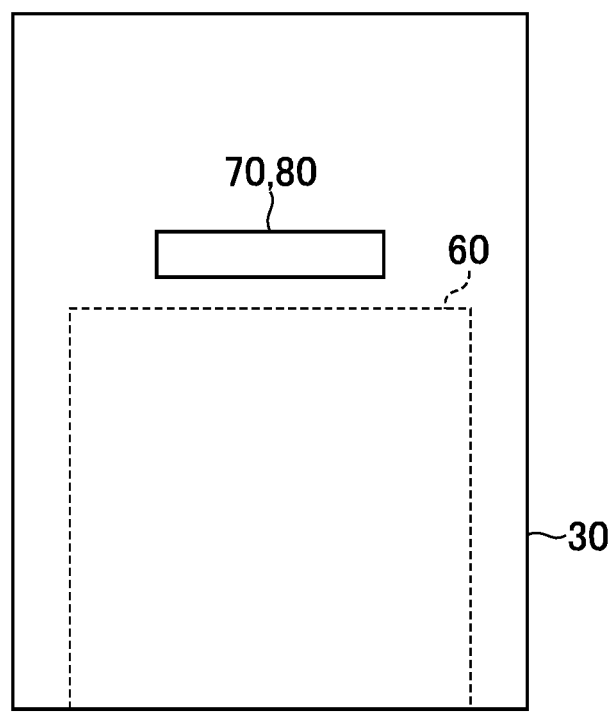
FIG. 10 explains an annotation information display area determination unit.

For example, the annotation information display area determination unit 46 determines the display area candidate 70, which has a largest total value T among the display area candidates 70 positioned outside the characteristic area (that is, a display area candidate 70 not included in the characteristic area), to be the display area of the annotation information. For example, in the case where the display area candidate 70 shown in FIG. 10 is the display area candidate 70, which has a smallest total value T among the display area candidates 70 positioned outside the characteristic area 60, the display area candidate 70 shown in FIG. 10 is determined to be the display area 80 of the annotation information.

Note that an operation of the annotation information display area determination unit 46 is not limited to the example described above. That is, a method for determining a display area of annotation information is not limited to the above described example. Details of an operation of the annotation information display area determination unit 46 are to be described later (see step S310 in FIG. 13).

The data output unit 48 outputs data on the target image with the annotation information displayed in the display area determined by the annotation information display area determination unit 46.

For example, the data output unit 48 displays the data on the target image with the annotation information displayed in the display area determined by the annotation information display area determination unit 46 (see FIG. 3) on the display unit 16. Alternatively, the data output unit 48 generates data on the target image with the annotation information displayed in the display area determined by the annotation information display area determination unit 46 (see FIG. 3), and outputs (stores) the data to the storage unit 12 or the database.

Figure 11:
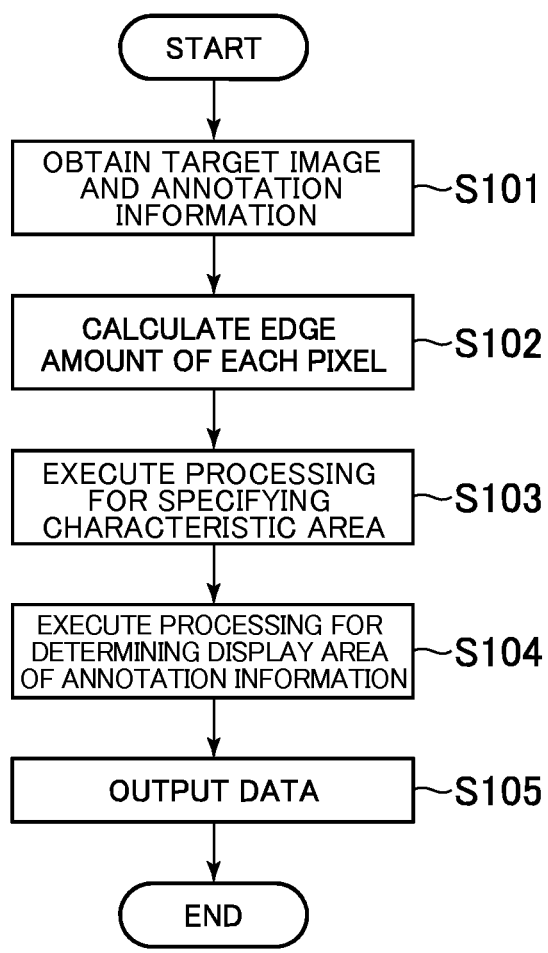
FIG. 11 is a flowchart showing one example of processing executed in the image processing device.

Processing that is executed in the image processing device 10 to implement the above described function blocks will be described. FIG. 11 is a flowchart showing one example of processing that is executed in the image processing device to output data on the target image with annotation information displayed therein. The control unit 11 executes the processing shown in FIG. 11 according to a program, to thereby function as the area setting unit 40, the calculation unit 42, the characteristic area detection unit 44, the annotation information display area determination unit 46, and the data output unit 48.

As shown in FIG. 11, initially, the control unit 11 obtains the target image and annotation information from the database 20 (S101). The control unit 11 then calculates an edge amount of each pixel in the target image, based on the expressions (1) to (5) mentioned above (S102).

Figure 12:
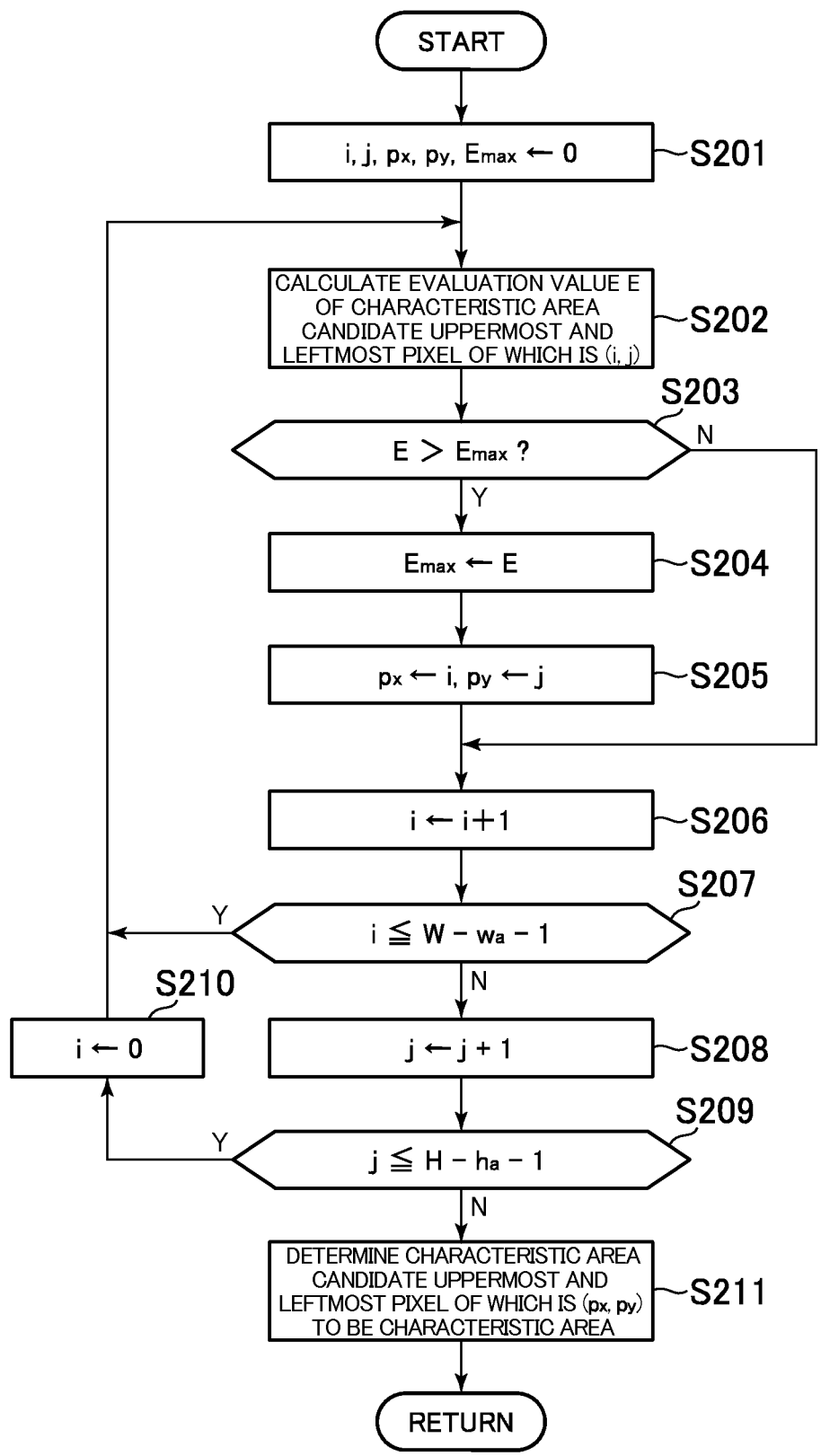
FIG. 12 is a flowchart showing one example of processing executed in the image processing device.

Then, the control unit 11 executes processing for specifying the characteristic area of the target image (S103). FIG. 12 is a flowchart showing one example of processing for specifying the characteristic area of the target image.

As shown in FIG. 12, initially, the control unit 11 initializes the variables i, $p_x$, $p_y$, $E_{max}$ to zero respectively (S201). Then, the control unit 11 calculates an evaluation value E of a characteristic area candidate 50, which has the uppermost and leftmost pixel (i, j), the height ha, and the width wa (S202). The control unit 11 calculates the total value T of the edge amounts S of the pixels within the characteristic area candidate 50, using the expression (6) mentioned above, to obtain the total value T calculated as the evaluation value E. In this case, the height (ha) and the width (wa) of the characteristic area candidate 50 are substituted into "h" and "w" in the expression (6) mentioned above.

After execution of the processing of step S202, the control unit 11 determines whether or not the evaluation value E calculated at step S202 is greater than the variable $E_{max}$ (S203). When the evaluation value E is greater than the variable $E_{max}$, the control unit 11 sets the evaluation value E calculated at step S202 as the variable $E_{max}$ (S204). Further, the control unit 11 sets the variables i and j as the variables $p_x$ and $p_y$, respectively (S205). Through the processing of steps S203 to S205, the variable $E_{max}$ resultantly indicates the largest value of the evaluation value E, and the variables $p_x$ and $p_y$ indicate the values of the variables i and j of when the evaluation value E is at its largest value.

In the case where the processing of steps S204 and S205 is executed or where it is determined at step S203 that the evaluation value E is not greater than the variable Emax, the control unit 11 adds one to the variable i (S206). Then, the control unit 11 determines whether or not the variable i is equal to or less than the value (W−wa−1) (S207).

When the variable i is equal to or less than the value (W−wa−1), the control unit 11 executes again the processing of step S202. Meanwhile, when the variable i is not equal to or less than the value (W−wa−1), the control unit 11 adds one to the variable j (S208). Then, the control unit 11 determines whether or not the variable j is equal to or less than the value (H−ha−1) (S209).

When the variable j is equal to or less than the value (H−ha−1), the control unit 11 initializes the variable i to zero (S210), and executes again the processing of step S202. Meanwhile, when the variable j is not equal to or less than the value (H−ha−1), the control unit 11 determines a characteristic area candidate 50, which has the uppermost and leftmost pixel ($p_x$, $p_y$), the height ha, and the width wa, to be the characteristic area of the target image (S211). With the above, the processing shown in FIG. 12 is completed.

Figure 13:
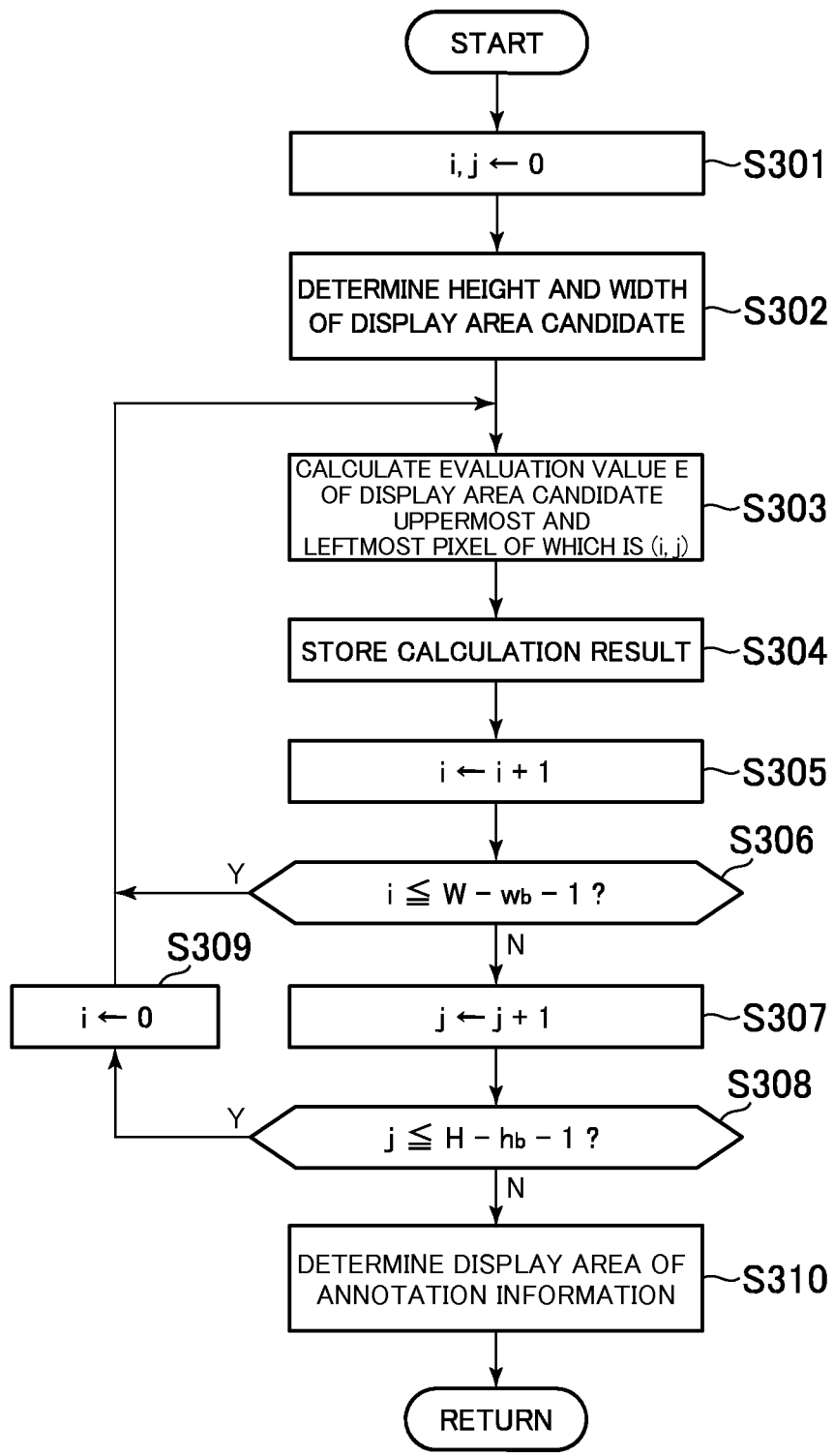
FIG. 13 is a flowchart showing one example of processing executed in the image processing device.

After the processing of step S103 in FIG. 11 (that is, the processing shown in FIG. 12) is executed, the control unit 11 executes processing for determining a display area of the annotation information (S104). FIG. 13 is a flowchart showing one example of processing for specifying a display area of annotation information.

As shown in FIG. 13, initially, the control unit 11 respectively initializes the variables i and j to zero (S301). The control unit 11 then determines the height (hb) and the width (wb) of the display area candidate 70 of the annotation information (S302).

Thereafter, the control unit 11 calculates an evaluation value E of a display area candidate 70, which has the uppermost and leftmost pixel (i, j), the width wb, and the height hb (S303). The control unit 11 calculates the total value T of the edge amounts of the pixels within the display area candidate 70, using the expression (6) mentioned above, to obtain the total value T as the evaluation value E. In this case, the height (hb) and the width (wb) of the display area candidate 70 are substituted into and "w" in the expression (6) mentioned above.

Figures 14, 15:
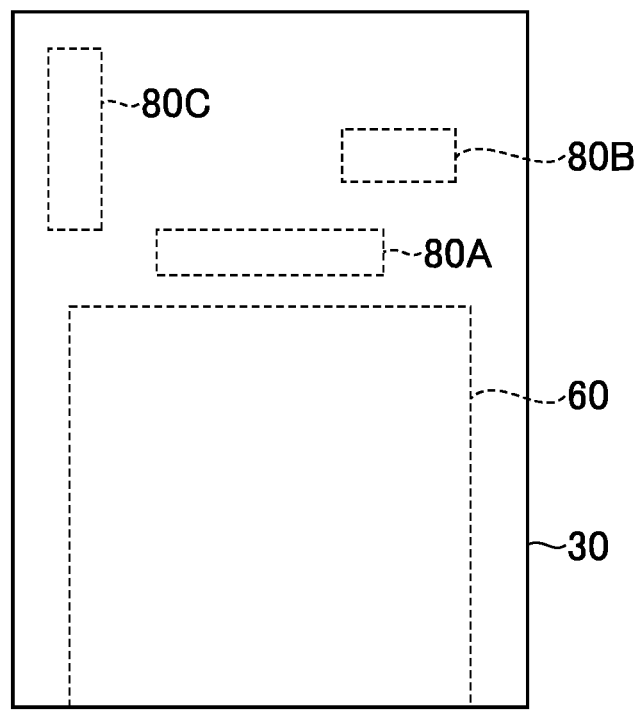
FIG. 14 shows one example of display area candidate data.
FIG. 15 explains a case in which a plurality of annotation information are associated with a single target image.

Then, the control unit 11 stores the result of calculation at step S303 (S304). Specifically, the control unit 11 stores a combination of information indicating the display area candidate 70 and the evaluation value E in the storage unit 12. With the processing of step S304, display area candidate data, as is shown in FIG. 14, for example, is generated in the storage unit 12. The display area candidate data shown in FIG. 14 is data indicating a combination of the uppermost and leftmost pixel of the display area candidate 70 and the evaluation value E.

After the processing of step S304 is executed, the control unit 11 adds one to the variable i (S305). The control unit 11 then determines whether or not the variable i is equal to or less than the value (W−wb−1) (S306).

When the variable i is equal to or less than the value (W−wb−1), the control unit 11 executes again the processing of step S303. Meanwhile, when the variable i is not equal to or less than the value (W−wb−1), the control unit 11 adds one to the variable j (S307). The control unit 11 then determines whether or not the variable j is equal to or less than the value (H−hb−1) (S308).

When the variable j is equal to or less than the value (H−hb−1), the control unit 11 initializes the variable i to zero (S309), and executes again the processing of step S303. Meanwhile, when the variable j is not equal to or less than the value (H−hb−1), the control unit 11 determines a display area of the annotation information (S310). For example, the control unit 11 determines one of the display area candidates 70 to be the display area of the annotation information, based on the display area candidate data.

Here, an example of processing executed at step S310 will be described. Below, five examples will be described.

[First Example] For example, the control unit 11 determines the display area candidate 70, which has a smallest evaluation value E among the display area candidates 70 satisfying the condition (A) mentioned below, to be the display area of the annotation information:
(A) a display area candidate 70 is not included in the characteristic area of the target image.

In this case, the display area of the annotation information is determined so as to avoid the characteristic area of the target image. Further, the display area of the annotation information is set to a part with a small edge amount inside the target image. That is, the display area of the annotation information is set to a part with a small change in color phase inside the target image.

[Second Example] For example, the control unit 11 determines one of the display area candidates 70 satisfying both of the conditions (A) and (B) mentioned below to be the display area of the annotation information:
(A) a display area candidate 70 is not included in the characteristic area of the target image; and
(B) the evaluation value E of a display area candidate 70 is less than a reference value.

For example, the control unit 11 selects, at random, one of the display area candidates 70 satisfying both of the above mentioned conditions (A) and (B) and determines the selected display area candidate 70 to be the display area of the annotation information. Alternatively, the control unit 11 determines the display area candidate 70, which has been found first among the display area candidates 70 satisfying both of the above mentioned conditions (A) and (B), to be the display area of the annotation information.

In this case as well, the display area of the annotation information is determined so as to avoid the characteristic area of the target image. Further, the display area of the annotation information is set to a part with a small edge amount inside the target image. That is, the display area of the annotation information is set to a part with a small change in color phase inside the target image.

Alternatively, the control unit 11 determines a display area candidate 70, which has a shortest distance from the characteristic area among the display area candidates 70 satisfying both of the above mentioned conditions (A) and (B), to be the display area of the annotation information. In this case, the display area of the annotation information is determined to be in a position near the characteristic area.

Note that the "distance from the characteristic area" refers to the distance from, for example, a representative point (for example, the barycenter) of the characteristic area to a representative point (the barycenter) of the display area candidate 70. Alternatively, the "distance from the characteristic area" refers to the distance (the shortest distance) from, for example, the boundary of the characteristic area to the boundary of the display area candidate 70. Still alternatively, the "distance from the characteristic area" may refer to, for example, the distance from the boundary of the characteristic area to a representative point of the display area candidate 70 and may refer to the distance from a representative point of the characteristic area to the boundary of the display area candidate 70.

[Third Example] For example, the control unit 11 determines one of the display area candidates 70 satisfying all of the conditions (A) to (C) mentioned below to be the display area of the annotation information:
(A) a display area candidate 70 is not included in the characteristic area of the target image;
(B) the evaluation value E of a display area candidate 70 is less than a reference value; and
(C) the distance from the characteristic area of the target image to a display area candidate 70 is shorter than a reference distance.

For example, the control unit 11 selects, at random, one of the display area candidates 70 satisfying all of the above mentioned conditions (A) to (C) and determines the selected display area candidate 70 to be the display area of the annotation information. Alternatively, the control unit 11 determines the display area candidate 70, which has been found first among the display area candidates 70 satisfying all of the above mentioned conditions (A) to (C), to be the display area of the annotation information.

[Fourth Example] For example, the control unit 11 determines one of the display area candidates 70 satisfying all of the conditions (A), (B), and (D) mentioned below to be the display area of the annotation information:
(A) a display area candidate 70 is not included in the characteristic area of the target image;
(B) the evaluation value E of a display area candidate 70 is less than a reference value; and
(D) the color information of a display area candidate 70 matches well with the display color information of the annotation information.

Note here that "color information of a display area candidate 70" refers to, for example, the average of the color values of the pixels within a display area candidate 70. Alternatively, "color information of a display area candidate 70" refers to, for example, the most common color among the colors of the pixels within a display area candidate 70. Meanwhile, "display color information of the annotation information" refers to the display color of the annotation.

In the storage unit 12 or the database 20, information concerning a model combination of colors (that is, a combination of colors that match well with each other) is stored. With reference to this information, the control unit determines whether or not the color information of the display area candidate 70 matches well with the display color information of the annotation information. That is, the control unit 11 determines whether or not the combination of the color information of the display area candidate 70 and the display color information of the annotation information coincides with any of the combinations indicated by the above described information.

For example, the control unit 11 selects, at random, one of the display area candidates 70 satisfying all of the above mentioned conditions (A), (B), and (D) and determines the selected display area candidate 70 to be the display area of the annotation information. Alternatively, the control unit 11 determines a display area candidate 70, which has been found first among the display area candidates 70 satisfying all of the above mentioned conditions (A), (B), and (D), to be the display area of the annotation information.

Still alternatively, the control unit 11 determines the display area candidate 70, which has a shortest distance from the characteristic area among the display area candidates 70 satisfying all of the above mentioned conditions (A), (B), and (D), to be the display area of the annotation information.

In the fourth example described above, the annotation information is displayed in a readily seen position in consideration of the color of the display area candidate 70 and the display color of the annotation.

[Fifth Example] For example, the control unit 11 determines one of the display area candidates 70 satisfying all of the conditions (A) to (D) mentioned below to be the display area of the annotation information:

(A) a display area candidate 70 is not included in the characteristic area of the target image;
(B) the evaluation value E of a display area candidate 70 is less than a reference value;
(C) the distance from the characteristic area of the target image to a display area candidate 70 is shorter than a reference distance; and
(D) the color information of a display area candidate 70 matches well with the display color information of the annotation information.

For example, the control unit 11 selects, at random, one of the display area candidates 70 satisfying all of the above mentioned conditions (A) to (D) and determines the selected display area candidate 70 to be the display area of the annotation information. Alternatively, the control unit 11 determines the display area candidates 70, which has been found first among the display area candidates 70 satisfying all of the above mentioned conditions (A) to (D), to be the display area of the annotation information.

After execution of the processing of step S104 in FIG. 11 (that is, the processing shown in FIG. 13), the control unit outputs data on the target image with the annotation information displayed in the display area determined at step S104 (S105). For example, the control unit 11 displays the above described data on the display unit 16. Alternatively, for example, the control unit 11 outputs (stores) the above described data in the storage unit 12 or the database 20.

Using the image processing device 10 according to the first embodiment described above, the characteristic area of a target image is specified without having a person designate the characteristic area of the target image. That is, using the image processing device 10 according to the first embodiment, a part having a large edge amount within a target image is specified as the characteristic area. That is, a part with a large change in color phase within a target image is specified as the characteristic area. For example, in the case of a food image 30 showing food served on a dish put on a table or the like, a change in color phase is large at a part showing the food, compared to other parts (for example, a part showing the table). Thus, using the image processing device 10 according to the first embodiment, the part showing the food is specified as the characteristic area.

Further, using the image processing device 10 according to the first embodiment, the display area of annotation information is set in consideration of the characteristic area. For example, it is possible to set a display area of annotation information so as to avoid the characteristic area of a target image without having a person designate a display area of the annotation information.

Note here, although a case where one annotation information is associated with one target image has been described above, a plurality of annotation information may be associated with one target image. FIG. 15 explains a case in which a plurality of annotation information are associated with one target image. The example shown in FIG. 15 assumes a case in which first annotation information, second annotation information, and third annotation information are associated with one target image.

In the case where a plurality of annotation information are associated with one target image, the processing of step S104 in FIG. 11 (that is, the processing shown in FIG. 13) is executed for each annotation information. As a result, a display area is determined for each annotation information. In the example shown in FIG. 15, the display area 80A of the first annotation information, the display area 80B of the second annotation information, and the display area 80C of the third annotation information are determined to be outside the characteristic area 60. Note that the display areas 80A, 80B, 80C may be hereinafter collectively referred to as a "display area 80".

In this case, the display areas 80A, 80B, 80C are determined so as not to overlap with each other. More preferably, the display areas 80A, 80B, 80C are determined so as to be apart from each other by a reference distance or more.

For example, in the case where the display area 80A of the first annotation information is determined first and the display area 80B of the second annotation information is determined thereafter, a display area candidate 70, which has a distance from the display area 80A of the first annotation information longer than the reference distance, is determined to be the display area 80B of the second annotation information.

Further, in the case where the display area 80B of the second annotation information is first determined and the display area 80C of the third annotation information is determined thereafter, a display area candidate 70, which has a distance from the display area 80A of the first annotation information longer than the reference distance, and a distance from the display area 80B of the second annotation information also longer than the reference distance, is determined to be the display area 80C of the third annotation information.

Although the explanation has been made above assuming that when a plurality of annotation information are associated with one target image, all of these annotation information are displayed, but it may be configured that only one or more annotation information among the plurality of annotation information are displayed. For example, there is a case in which a plurality of annotation information similar in content to each other are associated with one target image, and in such a case, it may be configured that only one or more annotation information among the plurality of annotation information are displayed.

In this case, annotation information to be displayed in the target image (that is, annotation information of the display target) may be selected from among the plurality of annotation information, based on the display area of each annotation information.

Below, assume a case in which the first annotation information, the second annotation information, and the third annotation information are associated with one target image, and display areas 80A, 80B, 80C as are shown in FIG. 15 are determined to be display areas 80 of these annotation information. Further, assume a case in which one of the first annotation information, the second annotation information, and the third annotation information is selected as the display target.

Examples of a method for selecting a display target in such a case will be described. Here, two examples will be described.

[First Example] For example, the control unit 11 selects one of the first annotation information, the second annotation information, and the third annotation information as the display target, based on the distance between the display area of each annotation information and the characteristic area. More specifically, the control unit 11 selects annotation information corresponding to the display area 80, which has a shortest distance from the characteristic area 60 among the display areas 80A, 80B, and 80C, as the display target.

Note here that the "distance from the characteristic area 60" refers to the distance between a representative point (for example, the barycenter) of the characteristic area 60 and a representative point (for example, the barycenter) of the display area 80. Alternatively, the "distance from the characteristic area 60" refers to the distance between the boundary of the characteristic area 60 and the boundary of the display area 80. Still alternatively, the "distance from the characteristic area 60" may refer to the distance between a representative point of the characteristic area 60 and the boundary of the display area 80, or the distance between the boundary of the characteristic area 60 and a representative point of the display area 80.

In the example shown in FIG. 15, as the display area 80A is positioned closest to the characteristic area 60, the first annotation information corresponding to the display area 80A is selected as the display target. In this case, only the first annotation information is displayed, and the second annotation information and the third annotation information are not displayed.

[Second Example] For example, the control unit 11 selects one of the first annotation information, the second annotation information, and the third annotation information as the display target, based on the combination of the color information of the display area of the annotation information and the display color information of the annotation information. In other words, the control unit 11 selects one of the first annotation information, the second annotation information, and the third annotation information as the display target, based on how well the color information of the display area of the annotation information matches well with the display color information of the annotation information.

Note here that the "color information of the display area of the annotation information" refers to, for example, the average of the color values of the pixels within an area in the target image, the area being determined to be the display area of the annotation information. Alternatively, the "color information of the display area of the annotation information" refers to, for example, the most common color among the colors of the pixels within an area in the target image, the area being determined to be the display area of the annotation information. Meanwhile, the "display color information of the annotation information" refers to the display color of the annotation.

In the storage unit 12 or the database 20, information on a model combination of colors (that is, a combination of colors that match well with each other) is stored. With reference to this information, the control unit 11 determines whether or not the color information of the display area of the annotation information matches well with the display color information of the annotation information. That is, the control unit 11 determines whether or not the combination of the color information of the display area of the annotation information and the display color information of the annotation information coincides with any of the combinations indicated by the above described information.

Below, a case described below, for example, is assumed:
the color information of the display area 80A of the first annotation information matches well with the display color information of the first annotation information;
the color information of the display area 80B of the second annotation information does not match well with the display color information of the second annotation information; and
the color information of the display area 80C of the third annotation information does not match well with the display color information of the third annotation information.

In the above described case, the first annotation information is selected as the display target. In this case, only the first annotation information is displayed, and the second annotation information and the third annotation information are not displayed.

Further, a case described below, for example, is assumed:
the color information of the display area 80A of the first annotation information matches well with the display color information of the first annotation information;
the color information of the display area 80B of the second annotation information matches well with the display color information of the second annotation information; and
the color information of the display area 80C of the third annotation information does not match well with the display color information of the third annotation information.

In the above described case, either one of the first annotation information and the second annotation information is selected as the display target. For example, either one of the first annotation information and the second annotation information is selected at random as the display target. Alternatively, one of the first annotation information and the second annotation information, which has the display area 80 positioned closer to the characteristic area 60, is selected as the display target. Still alternatively, both of the first annotation information and the second annotation information may be selected as display targets.

[Second Embodiment] A second embodiment of the present invention will be described. A hardware structure of an image processing device 10 according to the second embodiment of the present invention is similar to that of the first embodiment (see FIG. 1).

In the image processing device 10 according to the second embodiment, a cropped image (for example, a thumb nail image) that shows a characteristic part of a target image is generated by cropping the characteristic area of the target image. Further, in the image processing device 10 according to the second embodiment, annotation information is displayed within the cropped image. Regarding this point, the image processing device 10 according to the second embodiment differs from that of the first embodiment.

Figure 16:
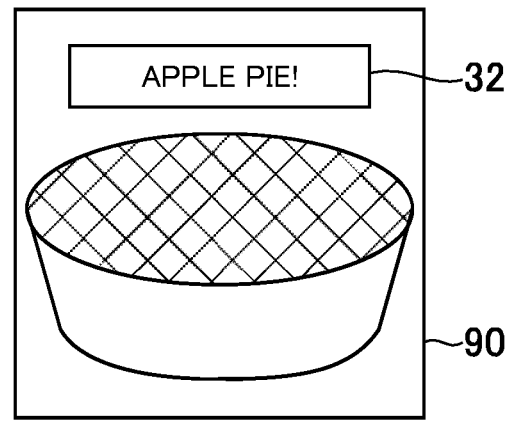
FIG. 16 shows one example of a cropped image.

FIG. 16 shows one example of a cropped image generated in the image processing device 10 according to the second embodiment. In the image processing device 10 according to the second embodiment, the annotation information 32 is displayed within a cropped image 90 generated by cropping the characteristic area of the target image.

In the image processing device 10 according to the second embodiment, processing to be described below is executed at step S310 in FIG. 13. In the following, five examples will be described as examples of the processing executed at step S310.

[First Example] For example, the control unit 11 determines the display area candidate 70, which has a smallest evaluation value E among the display area candidates 70 satisfying the condition (a) mentioned below, to be the display area of the annotation information:
(a) a display area candidate 70 is included in the characteristic area of the target image.

[Second Example] For example, the control unit 11 determines one of the display area candidates 70 satisfying both of the conditions (a) and (b) mentioned below as the display area of the annotation information:
(a) a display area candidate 70 is included in the characteristic area of the target image; and
(b) the evaluation value E of a display area candidate 70 is less than a reference value.

For example, the control unit 11 selects, at random, one of the display area candidates 70 satisfying both of the above mentioned conditions (a) and (b) and determines the selected display area candidate 70 to be the display area of the annotation information. Alternatively, the control unit 11 determines the display area candidate 70, which has been found first among the display area candidates 70 satisfying both of the above mentioned conditions (a) and (b), to be the display area of the annotation information.

Still alternatively, the control unit 11 determines the display area candidate 70, which has a shortest distance from the boundary of the characteristic area among the display area candidates 70 satisfying both of the above mentioned conditions (a) and (b), to be the display area of the annotation information. Note here that the "the distance from the boundary of the characteristic area" may refer to, for example, the distance from the boundary of the characteristic area to the boundary of the display area candidate 70 or the distance from the boundary of the characteristic area to a representative point (for example, the barycenter) of the display area candidate 70.

[Third Example] For example, the control unit 11 determines one of the display area candidates 70 satisfying all of the conditions (a) to (c) mentioned below to be the display area of the annotation information:
(a) a display area candidate 70 is included in the characteristic area of the target image;
(b) the evaluation value E of a display area candidate 70 is less than a reference value; and
(c) the distance from the boundary of the characteristic area of the target image to a display area candidate 70 is shorter than a reference distance.

For example, the control unit 11 selects, at random, one of the display area candidates 70 satisfying all of the above mentioned conditions (a) to (c) and determines the selected display area candidate 70 to be the display area of the annotation information. Alternatively, the control unit 11 determines the display area candidate 70, which has been found first among the display area candidates 70 satisfying all of the above mentioned conditions (a) to (c), to be the display area of the annotation information.

[Fourth Example] For example, the control unit 11 determines one of the display area candidates 70 satisfying all of the conditions (a), (b), and (d) mentioned below to be the display area of the annotation information:
(a) a display area candidate 70 is included in the characteristic area of the target image;
(b) the evaluation value E of a display area candidate 70 is less than a reference value; and
(d) the color information of a display area candidate 70 matches well with the display color information of the annotation information.

For example, the control unit 11 selects, at random, one of the display area candidates 70 satisfying all of the above mentioned conditions (a), (b), and (d) and determines the selected display area candidate 70 to be the display area of the annotation information. Alternatively, the control unit 11 determines the display area candidate 70, which has been found first among the display area candidates 70 satisfying all of the above mentioned conditions (a), (b), and (d), to be the display area of the annotation information.

Still alternatively, the control unit 11 determines the display area candidate 70, which has a shortest distance from the boundary of the characteristic area among the display area candidates 70 satisfying all of the above mentioned conditions (a), (b), and (d), to be the display area of the annotation information.

[Fifth Example] For example, the control unit 11 determines one of the display area candidates 70 satisfying all of the conditions (a) to (d) mentioned below to be the display area of the annotation information:
(a) a display area candidate 70 is included in the characteristic area of the target image;
(b) the evaluation value E of a display area candidate 70 is less than a reference value;
(c) the distance from the boundary of the characteristic area of the target image to a display area candidate 70 is shorter than a reference distance; and
(d) the color information of a display area candidate 70 matches well with the display color information of the annotation information.

For example, the control unit 11 selects, at random, one of the display area candidates 70 satisfying all of the above mentioned conditions (a) to (d) and determines the selected display area candidate 70 to be the display area of the annotation information. Alternatively, the control unit 11 determines the display area candidate 70, which has been found first among the display area candidates 70 satisfying all of the above mentioned conditions (a) to (d), to be the display area of the annotation information.

Note that, similarly to the first embodiment, in the image processing device 10 according to the second embodiment as well, a plurality of annotation information may be associated with one target image. In the case where a plurality of annotation information are associated with one target image, the processing of step S104 in FIG. 11 (that is, the processing shown in FIG. 13) is executed for each annotation information.

Further, similarly to the first embodiment, it may be configured that only one or more annotation information among the plurality of annotation information associated with one target image is displayed.

[Third Embodiment] A third embodiment of the present invention will be described. A hardware structure of the image processing device 10 according to the third embodiment of the present invention is similar to that of the first embodiment (see FIG. 1).

In the image processing device 10 according to the third embodiment, the display area of annotation information is determined without specifying the characteristic area of a target image. Regarding this point, the image processing device 10 according to the third embodiment differs from that of the first embodiment.

Function blocks that are implemented in the image processing device 10 according to the third embodiment will be described referring to FIG. 6. In the image processing device 10 according to the third embodiment, the first area setting unit 40A, the first calculation unit 42A, and the characteristic area detection unit 44 are omitted. That is, the image processing device 10 according to the third embodiment does not include the first area setting unit 40A, the first calculation unit 42A, and the characteristic area detection unit 44, but includes the second area setting unit 40B, the second calculation unit 42B, and the annotation information display area determination unit 46. Operations of the second area setting unit 40B and the second calculation unit 42B are similar to those in the first embodiment, and thus are not described here.

In the third embodiment, the annotation information display area determination unit 46 determines a display area of annotation information, based on the total value T of each of the plurality of display area candidates 70 set by the second area setting unit 40B.

For example, the annotation information display area determination unit 46 determines the display area candidate 70, which has a smallest total value T, to be the display area of the annotation information.

Further, for example, the annotation information display area determination unit 46 determines one of the display area candidates 70, which has a total value T less than a reference value, to be the display area of the annotation information.

Processing that is executed in the image processing device 10 according to the third embodiment will be described referring to FIGS. 11 and 13. In the image processing device 10 according to the third embodiment, the processing of step S103 in FIG. 11 is omitted. That is, processing for specifying the characteristic area is omitted.

Further, in the image processing device 10 according to the third embodiment, processing to be described below is executed at step S310 in FIG. 13. In the following, three examples will be described as examples of the processing executed at step S310.

[First Example] For example, the control unit 11 determines the display area candidate 70, which has a smallest evaluation value E among the plurality of display area candidates 70, to be the display area of the annotation information.

[Second Example] For example, the control unit 11 determines one of the display area candidates 70, which has an evaluation value E less than a reference value, to be the display area of the annotation information.

For example, the control unit 11 selects, at random, one of the display area candidates 70, which has an evaluation value E less than a reference value, and determines the selected display area candidate 70 to be the display area of the annotation information. Alternatively, the control unit 11 determines the display area candidate 70, which has been found first among the display area candidates 70 whose evaluation value E is less than a reference value, to be the display area of the annotation information.

[Third Example] For example, the control unit 11 determines one of the display area candidates 70 satisfying both of the two conditions mentioned below to be the display area of the annotation information:

the evaluation value E of a display area candidate 70 is less than a reference value; and the color information of a display area candidate 70 matches well with the display color information of the annotation information.

Note here that the "color information of a display area candidate 70" refers to, for example, the average of the color values of the pixels within a display area candidate 70. Alternatively, the "color information of a display area candidate 70" refers to, for example, the most common color among the colors of the pixels within a display area candidate 70. Meanwhile, the "display color information of the annotation information" refers to the display color of the annotation.

In the storage unit 12 or the database 20, information on a model combination of colors (that is, a combination of colors that match well with each other) is stored. The control unit 11 determines whether or not the color information of the display area candidate 70 matches well with the display color information of the annotation information, with reference to the information. That is, the control unit 11 determines whether or not the combination of the color information of the display area candidate 70 and the display color information of the annotation information coincides with any of the combinations indicated by the above described information.

For example, the control unit 11 selects, at random, one of the display area candidates 70 satisfying both of the above described two conditions and determines the selected display area candidate 70 to be the display area of the annotation information. Alternatively, the control unit 11 determines the display area 70, which has been found first among the display area candidates 70 satisfying both of the above described two conditions, to be the display area of the annotation information.

Using the above described image processing device 10 according to the third embodiment, the display area of annotation information is set in a part having a small edge amount within a target image. That is, the display area of annotation information is set to a part in which a change in color phase is small within a target image. For example, in the case of a food image 30 showing food served on a dish put on a table or the like, a change in color phase is large at a part showing the food, compared to other parts (for example, a part showing the table or the like). Thus, using the image processing device 10 according to the second embodiment, the display area of annotation information is set so as to avoid the part showing the food.

Note that, similarly to the first embodiment, in the image processing device 10 according to the third embodiment as well, a plurality of annotation information may be associated with one target image. In the case where a plurality of annotation information are associated with one target image, the processing of step S104 in FIG. 11 (that is, the processing shown in FIG. 13) is executed for each annotation information.

Further, similarly to the first embodiment, it may be configured that only one or more annotation information among the plurality of annotation information associated with one target image is displayed.

[Fourth Embodiment] A fourth embodiment of present invention will be described. A hardware structure of an image processing device 10 according to the fourth embodiment is similar to that of the first embodiment (see FIG. 1).

In the image processing device 10 according to the fourth embodiment, the display area of annotation information is determined without setting a plurality of display area candidates 70. Regarding this point, the image processing device 10 according to the fourth embodiment differs from that of the first embodiment.

Function blocks implemented in the image processing device 10 according to the fourth embodiment will be described with reference to FIG. 6. In the image processing device 10 according to the fourth embodiment, the second area setting unit 40B and the second calculation unit 42B are omitted. That is, the image processing device 10 according to the fourth embodiment does not include the second area setting unit 40B and the second calculation unit 42B, but includes the first area setting unit 40A, the first calculation unit 42A, the characteristic area detection unit 44, and the annotation information display area determination unit 46. Note that operations of the first area setting unit 40A, the first calculation unit 42A, and the characteristic area detection unit 44 are similar to those in the first embodiment, and thus are not described here.

In the fourth embodiment, the annotation information display area determination unit 46 determines a display area of annotation information, based on the total value T of each of the plurality of characteristic area candidates 50 set by the first area setting unit 40A.

For example, the annotation information display area determination unit 46 determines a display area of annotation information, based on the characteristic area specified by the characteristic area detection unit 44. For example, the annotation information display area determination unit 46 sets the display area of annotation information in an area other than the characteristic area specified by the characteristic area detection unit 44.

Processing that is executed in the image processing device 10 according to the fourth embodiment will be described referring to FIG. 11. In the image processing device 10 according to the fourth embodiment, processing as is described below will be executed at step S104 in FIG. 11 instead of the processing shown in FIG. 13. That is, at step S104, the control unit 11 sets the display area of annotation information in an area other than the characteristic area specified at step S103.

Using the image processing device 10 according to the fourth embodiment described above as well, it is possible to set the display area of annotation information so as to avoid the characteristic area of a target image without having a person designate a display area of the annotation information.

Note that although a case in which annotation information is displayed so as to avoid a characteristic part of a target image is mainly described in the above, it is possible to display annotation information by superimposing it on a characteristic part of a target image.

Further, similarly to the first embodiment, in the image processing device 10 according to the fourth embodiment as well, a plurality of annotation information may be associated with one target image. When a plurality of annotation information are associated with one target image, the display area of each of these plurality of annotation information is set in an area other than the characteristic area.

Further, similarly to the first embodiment, it may be configured that only one or more annotation information among the plurality of annotation information associated with one target image is displayed.

[Fifth Embodiment] A fifth embodiment of the present invention will be described. A hardware structure of an image processing device 10 according to the fifth embodiment is similar to that of the first embodiment (see FIG. 1).

In the first embodiment, the second embodiment, and the fourth embodiment, at step S202 in FIG. 12, the total value T of the edge amounts S of the pixels within the characteristic area candidate 50 is calculated using the expression (6) mentioned above to obtain the total value T as the evaluation value E. Further, a characteristic area candidate 50, which has the uppermost and leftmost pixel ($p_x$, $p_y$) calculated using the expressions (7) and (8) mentioned above, is determined to be the characteristic area of the target image.

Meanwhile, in the image processing device 10 according to the fifth embodiment, at step S202 in FIG. 12, an evaluation value E is calculated using the expression (9) mentioned below. Note that the expression (9) mentioned below is an expression to calculate an evaluation value E of a rectangular area or a square area, which has the uppermost and leftmost pixel (i, j), the height h, and the width w. In the expression (9) mentioned below, "T" is calculated using the expression (6) mentioned above, and "Tu", "Td", "Tl", and "Tr" are calculated using the expressions (10) to (13) mentioned below.

[Expression 5]

$$E = \frac{T}{Tu + Td + Tl + Tr} \quad (9)$$

$$Tu = \sum_{X=i}^{i+w-1} S_{X,j} \quad (10)$$

$$Td = \sum_{X=i}^{i+w-1} S_{X,j+h-1} \quad (11)$$

$$Tl = \sum_{Y=j}^{j+h-1} S_{i,Y} \quad (12)$$

$$Tr = \sum_{Y=j}^{j+h-1} S_{i+w-1,Y} \quad (13)$$

In the image processing device 10 according to the fifth embodiment, processing as is described below is executed at step S202 in FIG. 12.

Initially, the control unit 11 calculates the total value T of the edge amounts of the pixels in a characteristic area candidate 50, which has the uppermost and leftmost pixel (i, j). The total value T is calculated using the expression (6) mentioned above. In this case, the height (ha) and width (wa) of the characteristic area candidate 50 are substituted into "h" and "w" of the expression (6) mentioned above.

Figure 17:
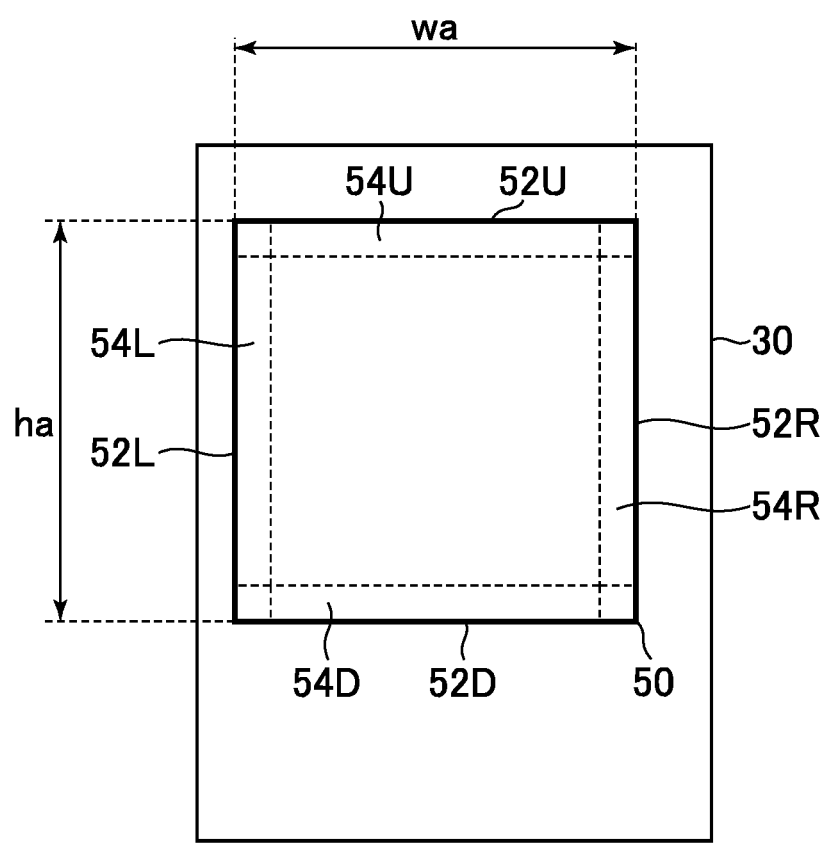
FIG. 17 explains a boundary portion of the characteristic area candidate.

Further, the control unit 11 calculates the total value of the edge amounts of the pixels in at least one boundary portion of the characteristic area candidate 50. Note here that "at least one boundary portion" refers to at least one of the upper boundary portion, the lower boundary portion, the left boundary portion, and the right boundary portion of the characteristic area candidate 50. FIG. 17 explains the upper boundary portion, the lower boundary portion, the left boundary portion, and the right boundary portion of the characteristic area candidate 50.

The upper boundary portion 54U refers to one or more pixel rows including a pixel row corresponding to the upper boundary 52U of the characteristic area candidate 50. For example, the upper boundary portion 54U is a pixel row corresponding to the upper boundary 52U of the characteristic area candidate 50. That is, the upper boundary portion 54U is a pixel row of pixels (i, j) to (i+wa−1, j). The upper boundary portion 54U may be a plurality of pixel rows from a pixel row of pixels (i, j) to (i+wa−1, j) to a pixel row of pixels (i, j+n) to (i+wa−1, j+n) (n: a natural number equal to or greater than one).

Similarly, the lower boundary portion 54D is one or more pixel rows including a pixel row corresponding to the lower boundary 52D of the characteristic area candidate 50. For example, the lower boundary portion 54D is a pixel row corresponding to the lower boundary 52D of the characteristic area candidate 50. That is, the lower boundary portion 54D is a pixel row of pixels (i, j+ha−1) to (i+wa−1, j+ha−1). Note that the lower boundary portion 54D may be a plurality of pixel rows from a pixel row of pixels (i, j+ha−1) to (i+wa−1, j+ha−1) to a pixel row of pixels (i, j+ha−1−n) to (i+wa−1, j+ha−1−n) (n: a natural number equal to or greater than one).

Further, the left boundary 54L is one or more pixel rows including a pixel row corresponding to the left boundary 52L of the characteristic area candidate 50. For example, the left boundary portion 54L is a pixel column corresponding the left boundary 52L of the characteristic area candidate 50. That is, the left boundary portion 54L is a pixel column of pixels (i, j) to (i, j+ha−1). Note that the left boundary portion 54L may be a plurality of pixel columns from a pixel column of pixels (i, j) to (i, j+ha−1) to a pixel column of pixels (i+n, j) to (i+n, j+ha−1) (n: a natural number equal to or greater than one).

Similarly, the right boundary portion 54R is one or more pixel columns including a pixel column corresponding to the right boundary 52R of the characteristic area candidate 50. For example, the right boundary portion 54R is a pixel column corresponding to the right boundary 52R of the characteristic area candidate 50. That is, the right boundary portion 54R is a pixel column of pixels (i+wa−1, j) to (i+wa−1, j+ha−1). Note that the right boundary portion 54R may be a plurality of pixel columns from a pixel column of pixels (i+wa−1, j) to (i+wa−1, j+ha−1) to a pixel column of pixels (i+wa−1−n, j) to (i+wa−1−n, j+ha−1) (n: a natural number equal to or greater than one).

Note that the following description is made based on an assumption that the pixel row corresponding to the upper boundary 52U of the characteristic area candidate 50 corresponds to the upper boundary portion 54U, the pixel row corresponding to the lower boundary 52D corresponds to the lower boundary portion 54D, the pixel column corresponding to the left boundary 52L of the characteristic area candidate 50 corresponds to the left boundary portion 54L, and the pixel column corresponding to the right boundary 52R corresponds to the right boundary portion 54R.

At step S202 in FIG. 12, the control unit 11 calculates the total value Tu of the edge amounts of the pixels in the upper boundary portion 54U of a characteristic area candidate 50, which has the uppermost and leftmost pixel (i, j). Further, the control unit 11 calculates the total value Td of the edge amounts of the pixels in the lower boundary portion 54D of the characteristic area candidate 50, which has the uppermost and leftmost pixel (i, j). The total value Tu is calculated using the expression (10) mentioned above, and the total value Td is calculated using the expression (11) mentioned above. In this case, the height (ha) and width (wa) of the characteristic area candidate 50 are substituted into h and w of the expressions (10) and (11) mentioned above.

Further, the control unit 11 calculates the total value Tl of the edge amounts of the pixels in the left boundary portion 54L of the characteristic area candidate 50, which has the uppermost and leftmost pixel (i, j). Further, the control unit 11 calculates the total value Tr of the edge amounts of the pixels in the right boundary portion 54R of the characteristic area candidate 50, which has the uppermost and leftmost pixel (i, j). The total value Tl is calculated using the expression (12) mentioned above, and the total value Tr is calculated using the expression (13) mentioned above. In this case, the height (ha) and width (wa) of the characteristic area candidate 50 are substituted into h and w of the expressions (12) and (13) mentioned above.

Then, the control unit 11 calculates an evaluation value E of the characteristic area candidate 50, which has the uppermost and leftmost pixel (i, j), using the expression (9) mentioned above. That is, the control unit 11 calculates a divided value (T/(Tu+Td+Tl+Tr)) which is obtained by dividing the total value T by the sum of the total values Tu, Td, Tl, Tr, and obtains the divided value as the evaluation value E. In this case, a characteristic area candidate 50, which has a largest divided value, is specified as the characteristic area of the target image.

Note that the control unit 11 may calculate a multiplicative inverse ((Tu+Td+Tl+Tr)/T) of the divided value (T/(Tu+Td+Tl+Tr)) and obtains the multiplicative inverse as the evaluation value E. In this case, it is only necessary that a characteristic area candidate 50, which has a smallest multiplicative inverse, is specified as the characteristic area of the target image.

As a result of an execution of the above mentioned processing, in the fifth embodiment, a rectangular or square area, which has the uppermost and leftmost pixel ($p_x$, $p_y$) given by the expressions (14) and (15) mentioned below, the height h, and the width w, is specified as the characteristic area.

[Expression 6]

$$p_x = \underset{i}{\operatorname{argmax}} \frac{\sum_{Y=j}^{j+h-1} \sum_{X=i}^{i+w-1} S_{X,Y}}{\sum_{X=i}^{i+w-1} (S_{X,j} + S_{X,j+h-1}) + \sum_{Y=j}^{j+h-1} (S_{i,Y} + S_{i+w-1,Y})} \quad (14)$$

$$p_y = \underset{j}{\operatorname{argmax}} \frac{\sum_{Y=j}^{j+h-1} \sum_{X=i}^{i+w-1} S_{X,Y}}{\sum_{X=i}^{i+w-1} (S_{X,j} + S_{X,j+h-1}) + \sum_{Y=j}^{j+h-1} (S_{i,Y} + S_{i+w-1,Y})} \quad (15)$$

In the image processing device 10 according to the fifth embodiment described above, a characteristic area candidate 50, which has a largest divided value (T/(Tu+Td+Tl+Tr)), is specified as the characteristic area. When the total value T of the edge amounts of the pixels of the whole characteristic area candidate 50 is large and the total value (Tu+Td+Tl+Tr) of the edge amounts of the pixels of the upper boundary portion 54U, the lower boundary portion 54D, the left boundary portion 54L, and the right boundary portion 54R of the characteristic area candidate 50 is small, the divided value becomes larger. A case in which the total value T of the edge amounts of the pixels of the whole characteristic area candidate 50 is large and the total value (Tu+Td+Tl+Tr) of the edge amounts of the pixels of the upper boundary portion 54U, the lower boundary portion 54D, the left boundary portion 54L, and the right boundary portion 54R of the characteristic area candidate 50 is small refers to a case in which the edge amount of the pixels in the middle portion is large, compared to those in the upper boundary portion 54U, the lower boundary portion 54D, the left boundary portion 54L, and the right boundary portion 54R.

Using the image processing device 10 according to the fifth embodiment, an area in the target image where a part with a large edge amount is positioned at the middle is specified as the characteristic area. That is, an area in the target image where a part with a large change in color phase is positioned at the middle is specified as the characteristic area. As a result, an area in the food image 30 where a part showing the food is positioned at the middle is specified as the characteristic area.

[First Modified Example of Fifth Embodiment] At step S202 in FIG. 12, the evaluation value E may be calculated using the expressions (16) and (17) mentioned below. The expression (16) mentioned below is an expression to be used when the target image is a vertically long image, while the expression (17) mentioned below is an expression to be used when the target image is a horizontally long image. Further, in the expressions (16) and (17) mentioned below, "T" is calculated using the expression (6) mentioned above, and "Tu", "Td", "Tl", and "Tr" are calculated using the expressions (10) to (13) mentioned above.

[Expression 7]

$$E = \frac{T}{Tu + Td} \quad (16)$$

$$E = \frac{T}{Tl + Tr} \quad (17)$$

In this first modified example, at step S202 in FIG. 12, the control unit 11 determines whether or not the target image is a vertically long image. Then, when the target image is a vertically long image, the control unit 11 calculates an evaluation value E, using the expression (16) mentioned above. That is, the control unit 11 calculates a divided value (T/(Tu+Td)) obtained by dividing the total value T by the sum of the total values Tu and Td and obtains the divided value as the evaluation value E. In this case, a characteristic area candidate 50, which has a largest divided value, is specified as the characteristic area of the target image.

Note that the control unit 11 may calculate a multiplicative inverse ((Tu+Td)/T) of the divided value (T/(Tu+Td)) to obtain the multiplicative inverse as the evaluation value E. In this case, it is only necessary that a characteristic area candidate 50, which has a smallest multiplicative inverse, is specified as the characteristic area of the target image.

Meanwhile, when the target image is a horizontally long image, the control unit 11 calculates an evaluation value E, using the expression (17) mentioned above. That is, the control unit 11 calculates a divided value (T/(Tl+Tr)) obtained by dividing the total value T by the sum of the total values Tl and Tr and obtains the divided value as the evaluation value E. In this case, a characteristic area candidate 50, which has a largest divided value, is specified as the characteristic area of the target image.

Note that the control unit 11 may calculate a multiplicative inverse ((Tl+Tr)/T) of the divided value (T/(Tl+Tr)) to obtain the multiplicative inverse as the evaluation value E. In this case, it is only necessary that a characteristic area candidate 50, which has a smallest multiplicative inverse, is specified as the characteristic area of the target image.

[Second Modified Example of Fifth Embodiment] At step S202 in FIG. 12, the evaluation value E may be calculated using the expressions (18) and (19) mentioned below. The expression (18) mentioned below is an expression to be used when the target image is a vertically long image, and the expression (19) mentioned below is an expression to be used when the target image is a horizontally long image. Further, in the expressions (18) and (19), "T" is calculated using the expression (6) mentioned above, and "Tu", "Td", "Tl", and "Tr" are calculated using the expressions (10) to (13) mentioned above.

[Expression 8]

$$E = \frac{T}{\max\{Tu, Td\}} \quad (18)$$

$$E = \frac{T}{\max\{Tl, Tr\}} \quad (19)$$

In this second modified example, the control unit 11 determines whether or not the target image is a vertically long image at step S202 in FIG. 12. Then, when the target image is a vertically long image, the control unit 11 calculates an evaluation value E, using the expression (18) mentioned above. That is, the control unit 11 calculates a divided value (T/max{Tu, Td}) obtained by dividing the total value T by larger one of the total values Tu and obtains the divided value as the evaluation value E. In this case, a characteristic area candidate 50, which has a largest divided value, is specified as the characteristic area of the target image.

Note that the control unit 11 may calculate a multiplicative inverse (max{Tu, Td}/T) of the divided value (T/max{Tu, Td}) and obtains the multiplicative inverse as the evaluation value E. In this case, it is only necessary that a characteristic area candidate 50, which has a smallest multiplicative inverse, is specified as the characteristic area of the target image.

Meanwhile, when the target image is a horizontally long image, the control unit 11 calculates an evaluation value E, using the expression (19) mentioned above. That is, the control unit 11 calculates a divided value (T/max{Tl, Tr}) obtained by dividing the total value T by a larger one of the total values Tl and Tr and obtains the divided value as the evaluation value E. In this case, a characteristic area candidate 50, which has a largest divided value, is specified as the characteristic area of the target image.

Note that the control unit 11 may calculate a multiplicative inverse (max{Tl, Tr}/T) of the divided value (T/max{Tl, Tr}) and obtains the multiplicative inverse as the evaluation value E. In this case, it is only necessary that a characteristic area candidate 50, which has a smallest multiplicative inverse, is specified as the characteristic area of the target image.

Using the above described first and second modified examples as well, an area in the target image where a part with a large edge amount is positioned at the middle is specified as the characteristic area. That is, an area in the target image where a part with a large change in color phase is positioned at the middle is specified as the characteristic area. As a result, for example, an area in the food image 30 where a part showing the food is positioned at the middle is specified as the characteristic area.

Note that although a case in which an evaluation value E of the characteristic area candidate 50 is calculated is mainly described in the above, the expression (9), (16), (17), (18), or (19) mentioned above may be used also in calculation of an evaluation value E of the display area candidate 70. Further, the expression (9), (16), (17), (18), or (19) mentioned above may be used in the second embodiment, the third embodiment, and the fourth embodiment as well.

[Sixth Embodiment] A sixth embodiment of the present invention will be described. A hardware structure of an image processing device 10 according to the sixth embodiment is similar to that of the first embodiment (see FIG. 1).

In the image processing device 10 according to the sixth embodiment, at step S202 in FIG. 12, a weighted total value T calculated using the expression (20) mentioned below is calculated instead of the total value T calculated using the expression (6) mentioned above. Note that the expression (20) is an expression to calculate a weighted evaluation value E of a rectangular area or a square area, which has the uppermost and leftmost pixel (i, j), the height h, and the width w. Further, in the expression (20) mentioned below, "G" represents a gauss function shown in the expression (21) mentioned below.

[Expression 9]

$$T = \sum_{Y=j}^{j+h-1} \sum_{X=i}^{i+w-1} G\left(X, i+\frac{w}{2}, \frac{w}{6}\right) G\left(Y, j+\frac{h}{2}, \frac{h}{6}\right) S_{X,Y} \quad (20)$$

$$G(x, \mu, \sigma) = \frac{1}{\sqrt{2\pi\sigma^2}} \exp\left(-\frac{(x-\mu)^2}{2\sigma^2}\right) \quad (21)$$

In the expression (20) above, the gauss function G serves as a weight for the edge amount of each pixel. In this case, a weight for the pixels in the middle portion of the rectangular area (or the square area) is set higher than that for the pixels in a boundary portion of the rectangular area (or the square area). Accordingly, a weighted total value T becomes larger as the edge amount of the pixels in the middle portion of the rectangular area (or the square area) becomes larger.

In the image processing device 10 according to the sixth embodiment, processing as is described below is executed at step S202 in FIG. 12.

That is, the control unit 11 calculates a weighted total value of the edge amounts of the pixels of a characteristic area candidate 50, which has the uppermost and leftmost pixel (i, j). The weighted total value T is calculated using the expression (20) mentioned above. In this case, the height (ha) and width (wa) of the characteristic area candidate 50 are substituted into "h", "w" of the expression (20) mentioned above.

The control unit 11 obtains the weighted total value T mentioned above as the evaluation value E. In this case, a characteristic area candidate 50, which has a largest weighted total value T, is specified as the characteristic area of the target image.

As a result of execution of such processing, in the image processing device 10 according to the sixth embodiment, a rectangular area or a square area, which has the uppermost and leftmost pixel ($p_x$, $p_y$) given by the expressions (22) and (23) mentioned below, the height h, and the width w, is specified as the characteristic area.

[Expression 10]

$$p_x = \underset{i}{\mathrm{argmax}} \sum_{Y=j}^{j+h-1} \sum_{X=i}^{i+w-1} G\left(X, i+\frac{w}{2}, \frac{w}{6}\right) G\left(Y, j+\frac{h}{2}, \frac{h}{6}\right) S_{X,Y} \quad (22)$$

$$p_y = \underset{j}{\mathrm{argmax}} \sum_{Y=j}^{j+h-1} \sum_{X=i}^{i+w-1} G\left(X, i+\frac{w}{2}, \frac{w}{6}\right) G\left(Y, j+\frac{h}{2}, \frac{h}{6}\right) S_{X,Y} \quad (23)$$

In the image processing device 10 according to the sixth embodiment 10 described above, a characteristic area candidate 50, which has a largest weighted total value T, is determined to be the characteristic area. A weighted total value T becomes large when the edge amount of the pixels in the middle portion of the characteristic area candidate 50 is large. Thus, using the image processing device 10 according to the sixth embodiment, a characteristic area candidate 50 with a large edge amount of the pixels in the middle portion is determined to be the characteristic area. As a result, using the image processing device 10 according to the sixth embodiment, an area in the target image where a part with a large edge amount is positioned at the middle is specified as the characteristic area. That is, an area in the target image where a part with a large change in color phase is positioned at the middle is specified as the characteristic area. As a result, an area in the food image 30 where a part showing the food is positioned at the middle is specified as the characteristic area.

[Modified Example of Sixth Embodiment] At step S202 in FIG. 12, a weighted total value T may be calculated using the expressions (24) and (25) mentioned below. The expression (24) mentioned below is an expression to be used when the target image is a vertically long image, and the expression (25) mentioned below is an expression to be used when the target image is a horizontally long image. In the expression (25) mentioned below as well, "G" represents a gauss function shown in the expression (21) mentioned above.

[Expression 11]

$$T = \sum_{Y=j}^{j+h-1} \sum_{X=i}^{i+w-1} G\left(Y, j+\frac{h}{2}, \frac{h}{6}\right) S_{X,Y} \quad (24)$$

$$T = \sum_{Y=j}^{j+h-1} \sum_{X=i}^{i+w-1} G\left(X, i+\frac{w}{2}, \frac{w}{6}\right) S_{X,Y} \quad (25)$$

In the expression (24) mentioned above, a weight for a pixel in the middle portion of the characteristic area candidate 50 is set high, compared to that for a pixel in the upper boundary portion 54U and the lower boundary portion 54D of the characteristic area candidate 50. Thus, as the edge amount of the pixels in the middle portion of the characteristic area candidate 50 becomes larger, a weighted total value T becomes larger.

Further, in the expression (25), a weight for a pixel in the middle portion of the characteristic area candidate 50 is set high, compared to that for a pixel in the left boundary portion 54L and the right boundary portion 54R of the characteristic area candidate 50. Thus, as the edge amount of the pixels in the middle portion of the characteristic area candidate 50 becomes larger, a weighted total value T becomes larger.

In this modified example, processing as is described below is executed at step S202 in FIG. 12.

Initially, the control unit 11 determines whether or not the target image is a vertically long image. Then, when the target image is a vertically long image, the control unit 11 calculates a weighted total value T, using the expression (24) mentioned above, to obtain the weighted total value T as the evaluation value E.

Meanwhile, when the target image is a horizontally long image, the control unit 11 calculates a weighted total value T, using the expression (25) mentioned above, to obtain the weighted total value T as the evaluation value E.

In this modified example, as the evaluation value E is calculated as described above, when the target image is a vertically long image, a characteristic area candidate 50, which has a largest weighted total value T calculated using the expression (24) mentioned above, is specified as the characteristic area of the target image. Meanwhile, when the target image is a horizontally long image, a characteristic area candidate 50, which has a largest weighted total value T calculated using the expression (25) mentioned above, is specified as the characteristic area of the target image.

Using this modified example as well, a characteristic area candidate 50 with a large edge amount of the pixels in the middle portion is specified as the characteristic area. That is, a characteristic area candidate 50 in a target image where a part with a large edge amount is positioned at the middle is specified as the characteristic area. That is, a characteristic area candidate 50 in a target image where a part with a large change in color phase is positioned at the middle is specified as the characteristic area. As a result, an area in the food image 30 where a part showing the food is positioned at the middle is specified as the characteristic area.

Although a case in which an evaluation value E of the characteristic area candidate 50 is calculated is mainly described in the above, note that the expression (20), (24), or (25) may be used in calculation of an evaluation value E of the display area candidate 70. Further, a weighted total value T calculated using the expressions (20), (24) and (25) mentioned above may be used also in the second embodiment, the third embodiment, and the fourth embodiment as well, instead of the total value T.

[Seventh Embodiment] A seventh embodiment of the present invention will be described. A hardware structure of the image processing device 10 according to the seventh embodiment is similar to that of the first embodiment (see FIG. 1).

In the first embodiment, it is assumed in the description that "edge" refers to an extent of change in color of a target image, and an "edge amount of a pixel" refers to an amount relevant to an extent of difference in color phase between a pixel and one or more pixels located around the pixel. In the seventh embodiment, on the other hand, "edge" refers to an extent of change in brightness in a target image, and an "edge amount of a pixel" refers to an amount relevant to a difference in brightness between a pixel and one or more pixels located around the pixel. Regarding this point, the image processing device 10 according to the seventh embodiment differs from that of the first embodiment.

That is, in the image processing device 10 according to the seventh embodiment, the Y value of each pixel, calculated using the expression (4) mentioned above, is used as the pixel value I of the pixel. That is, the Y value of each pixel is substituted as the pixel value I of the pixel into the expressions (1) to (3) mentioned above, to thereby calculate the edge amount S of the pixel.

Using the image processing device 10 according to the seventh embodiment described above, a part in a target image with a large change in brightness is specified as the characteristic area. For example, in the case of an image showing food served on a dish put on a table or the like, change in brightness is large in a part showing the food, compared to in other parts (for example, a part showing a table or the like). Therefore, with the above described setting, it is possible to specify the part showing the food as the characteristic area.

Note that the seventh embodiment can be combined with the second to sixth embodiments. That is, in the second to sixth embodiments as well, an "edge amount of a pixel" may be an amount relevant to a difference in brightness between a pixel and one or more pixels located around the pixel.

[Eighth Embodiment] An eighth embodiment of the present invention will be described. A hardware structure of the image processing device 10 according to the eighth embodiment of the present invention is similar to that of the first embodiment (see FIG. 1).

In the image processing device 10 according to the eighth embodiment, a plurality of kinds of processing are prepared in advance as processing for determining a display area of annotation information (hereinafter referred to as "display area determination processing"). Further, in the image processing device 10 according to the eighth embodiment, display area determination processing in accordance with a characteristic of a target image (the food image 30) is selected from among the plurality of kinds of display area determination processing, and the display area determination processing is executed. Regarding this point, the image processing device 10 according to the eighth embodiment differs from that of the first embodiment.

FIG. 18 shows one example of a plurality of kinds of display area determination processing. In FIG. 18, eight kinds of display area determination processing (first to eighth display area determination processing) are shown. Note here that "display area determination processing" refers to a series of processing for determining a display area of annotation information, and the processing of steps S103 and S104 in FIG. 11, for example, corresponds to the "display area determination processing".

The first display area determination processing to the eighth display area determination processing differ from each other at the points shown below:
(1) which of color phase and brightness is used as a base of calculation of an edge amount of each pixel; and
(2) a method for calculating an evaluation value E of the characteristic area candidate 50 or the display area candidate 70.

The first display area determination processing corresponds to the first embodiment. That is, in the first display area determination processing, the edge amount S calculated based on the $C_B$ value and the $C_R$ value (a color phase) of each pixel is used. Further, in the first display area determination processing, the total value T calculated using the expression (6) mentioned above is used as the evaluation value E of the characteristic area candidate 50 or the display area candidate 70.

The second display area determination processing corresponds to the fifth embodiment. That is, in the second display area determination processing, the edge amount S calculated based on the $C_B$ value and the $C_R$ value (a color phase) of each pixel is used. Further, in the second display area determination processing, an evaluation value E of the characteristic area candidate 50 or the display area candidate 70 is calculated using the expression (9) mentioned above.

The third display area determination processing corresponds to the first modified example of the fifth embodiment. That is, in the third display area determination processing, the edge amount S calculated based on the $C_B$ value and the $C_R$ value (a color phase) of each pixel is used. Further, in the third display area determination processing, the evaluation value E of the characteristic area candidate 50 or the display area candidate 70 is calculated using the expressions (16) and (17) mentioned above.

Note that the third display area determination processing may correspond to the second modified example of the fifth embodiment. That is, in the third display area determination processing, the evaluation value E of the characteristic area candidate 50 or the display area candidate 70 may be calculated, using the expressions (18) and (19) mentioned above.

The fourth display area determination processing corresponds to the sixth embodiment. That is, in the fourth display area determination processing, the edge amount S calculated based on the $C_B$ value and the $C_R$ value (a color phase) of each pixel is used. Further, in the fourth display area determination processing, the weighted total value T calculated using the expression (20) mentioned above is used as the evaluation value E of the characteristic area candidate 50 or the display area candidate 70.

Note that the fourth display area determination processing may correspond to a modified example of the sixth embodiment. That is, in the fourth display area determination processing, the weighted total value T calculated using the expressions (24) and (25) mentioned above may be used as the evaluation value E of the characteristic area candidate 50 or the display area candidate 70.

The fifth display area determination processing corresponds to the seventh embodiment. That is, in the fifth display area determination processing, the edge amount S calculated based on the Y value (brightness) of each pixel is used. Further, in the fifth display area determination processing, the total value T calculated using the expression (6) mentioned above is used as the evaluation value E of the characteristic area candidate 50 or the display area candidate 70.

The sixth display area determination processing corresponds to the combination of the seventh embodiment and the fifth embodiment. That is, in the sixth display area determination processing, the edge amount S calculated based on the Y value (brightness) of each pixel is used. Further, in the sixth display area determination processing, an evaluation value E of the characteristic area candidate 50 or the display area candidate 70 is calculated using the expression (9) mentioned above.

The seventh display area determination processing corresponds to the combination of the seventh embodiment and the first modified example of the fifth embodiment. That is, in the seventh display area determination processing, the edge amount S calculated based on the Y value (brightness) of each pixel is used. Further, in the seventh display area determination processing, an evaluation value E of the characteristic area candidate 50 or the display area candidate 70 is calculated using the expressions (16) and (17) mentioned above.

Note that the seventh display area determination processing may correspond to the combination of the seventh embodiment and the second modified example of the fifth embodiment. That is, in the seventh display area determination processing, an evaluation value E of the characteristic area candidate 50 or the display area candidate 70 may be calculated using the expressions (18) and (19) mentioned above.

The eighth display area determination processing corresponds to the combination of the seventh embodiment and the sixth embodiment. That is, in the eighth display area determination processing, the edge amount S calculated based on the Y value (brightness) of each pixel is used. Further, in the eighth display area determination processing, the weighted total value T calculated using the expression (20) mentioned above is used as the evaluation value E of the characteristic area candidate 50 or the display area candidate 70.

Note that the eighth display area determination processing may correspond to the combination of the seventh embodiment and the modified example of the sixth embodiment. That is, in the eighth display area determination processing, the weighted total value T calculated using the expressions (24) and (25) mentioned above may be used as the evaluation value E of the characteristic area candidate 50 or the display area candidate 70.

In the image processing device 10 according to the eighth embodiment, display area determination processing data (association data) as is shown in FIG. 19, for example, is stored in the storage unit 12. The display area determination processing data shown in FIG. 19 is data associating distribution pattern information of the edge amount with the display area determination processing. In the display area determination processing data shown in FIG. 19, distribution pattern information of the edge amount is associated with each of the first to eighth display area determination processing. Note that the first to eighth display area determination processing are similar to those shown in FIG. 18.

The distribution pattern information of the edge amount is information concerning the distribution pattern of the edge amount of an image. For example, the distribution pattern information is information indicating a pattern of change of the total value T relative to the vertical direction and/or horizontal direction of an image. For example, the distribution pattern information is information indicating a pattern of change of the total value T of each characteristic area candidate 50, when the total value T is shown, associated with the position (for example, the position of the uppermost and leftmost pixel) of the characteristic area candidate 50. Further, for example, the distribution pattern information is information indicating the pattern of change of the total value T calculated based on a first edge amount (that is, an edge amount calculated based on the $C_B$ value and the $C_R$ value of a pixel) and the pattern of change of the total value T calculated based on a second edge amount (that is, an edge amount calculated based on the Y value of a pixel).

Further, for example, the distribution pattern information may be information indicating a pattern of the total value of the edge amounts for each pixel row or each pixel column of an image. For example, the distribution pattern information may be information indicating a pattern of the total value of the first edge amounts for each pixel row or each pixel column of an image (that is, an edge amount calculated based on the $C_B$ value and the $C_R$ value (color phase) of a pixel) and a pattern of the total value of the second edge amounts for each pixel row or each pixel column of an image (that is, an edge amount calculated based on the Y value (brightness) of a pixel).

Processing that is executed in the image processing device 10 according to the eighth embodiment will be described. In the image processing device 10 according to the eighth embodiment, the processing shown in FIG. 20 is executed, instead of the processing shown in FIG. 11.

Figure 20:
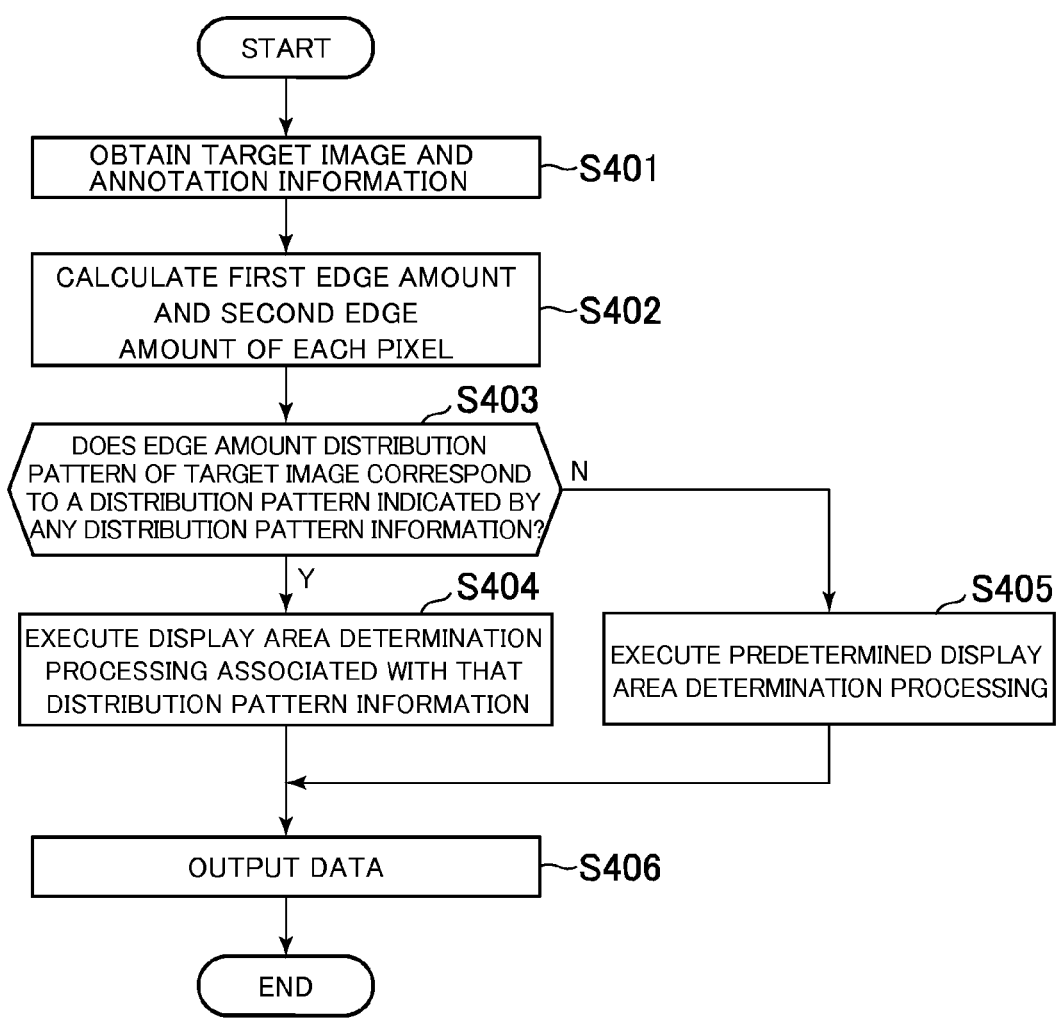
FIG. 20 is a flowchart showing another example of processing executed in the image processing device.

As shown in FIG. 20, initially, the control unit 11 obtains a target image and annotation information from the database 20 (S401). Further, the control unit 11 calculates the first edge amount and the second edge amount of each pixel of the target image (S402).

Here, a "first edge amount" is an edge amount calculated based on the $C_B$ value and the $C_R$ value (color phase) of a pixel, and is an edge amount S calculated using the expressions (1) to (3) mentioned above, based on the pixel value I indicated by the expression (5) mentioned above. Meanwhile, a "second edge amount" is an edge amount calculated based on the Y value (brightness) of a pixel, and is an edge amount S calculated using the Y value of a pixel as the pixel value I and using the expressions (1) to (3) mentioned above.

Thereafter, the control unit 11 determines whether or not the distribution pattern of the edge amount of the target image corresponds to a distribution pattern indicated by any of the first to eighth distribution pattern information (S403). For example, the control unit 11 determines, based on the edge amount of the pixels in the target image obtained at step S401, whether or not the distribution pattern of the edge amount of the target image corresponds to a distribution pattern indicated by any of the first to eighth distribution pattern information.

In the case where the distribution pattern of the edge amount of the target image corresponds to a distribution pattern indicated by any of the first to eighth distribution pattern information, the control unit 11 executes the display area determination processing associated with the distribution pattern information (S404).

The content of the processing of this step S404 is basically similar to those of steps S103 and S104 in FIG. 11, though in this case an edge amount corresponding to the distribution pattern of the edge amount of the target image is used as the edge amount. Further, a calculation method corresponding to the distribution pattern of the edge amount of the target image is used as a calculation method of the evaluation value.

For example, in the case where the distribution pattern of the edge amount of the target image corresponds to the distribution pattern indicated by the fourth distribution pattern information, the first edge amount based on the color phase is used (see FIG. 18). Further, the evaluation value E of the characteristic area candidate 50 or the display area candidate 70 is calculated using the expression (20) mentioned above (see FIG. 18).

Meanwhile, when the distribution pattern of the edge amount of the target image does not correspond to a distribution pattern indicated by any of the first to eighth distribution pattern information, the control unit 11 executes a predetermined display area determination processing (for example, the first display area determination processing) among the first to eighth display area determination processing, to thereby specify the characteristic area (S405). The processing of this step S405 is basically similar to those of steps S103 and S104 shown in FIG. 11.

After execution of step S404 or S405, the control unit 11 outputs data on the target image with the annotation information displayed in the display area determined at step S404 or S405 (S406). For example, the control unit 11 displays the above mentioned data on the display unit 16. Further, for example, the control unit 11 outputs (stores) the above mentioned data to the storage unit 12 or the database 20. With the above, description on the processing shown in FIG. 20 is finished.

Using the image processing device 10 according to the eighth embodiment explained above, the display area of annotation information is determined through the display area determination processing in accordance with a characteristic (the distribution pattern of the edge amount) of a target image (the food image 30).

[Ninth Embodiment] A ninth embodiment of the present invention will be described. A hardware structure of the image processing device 10 according to the ninth embodiment of the present invention is similar to that of the first embodiment (see FIG. 1).

Similar to the eighth embodiment, in the image processing device 10 according to the ninth embodiment as well, a plurality of kinds of display area determination processing are prepared in advance.

In the image processing device 10 according to the ninth embodiment, however, each of the plurality of kinds of display area determination processing is executed with respect to one annotation information, to thereby a plurality of display areas are obtained for the one annotation information. The obtained plurality of display areas are presented to a user, and the user selects one of the plurality of display areas. In this case, the display area selected by the user is determined to be the display area of the annotation information, and the annotation information is displayed in the display area selected by the user.

Processing that is executed in the image processing device 10 according to the ninth embodiment will be described. In the image processing device 10 according to the ninth embodiment, the processing shown in FIG. 21 is executed instead of the processing shown in FIG. 11.

Figure 21:
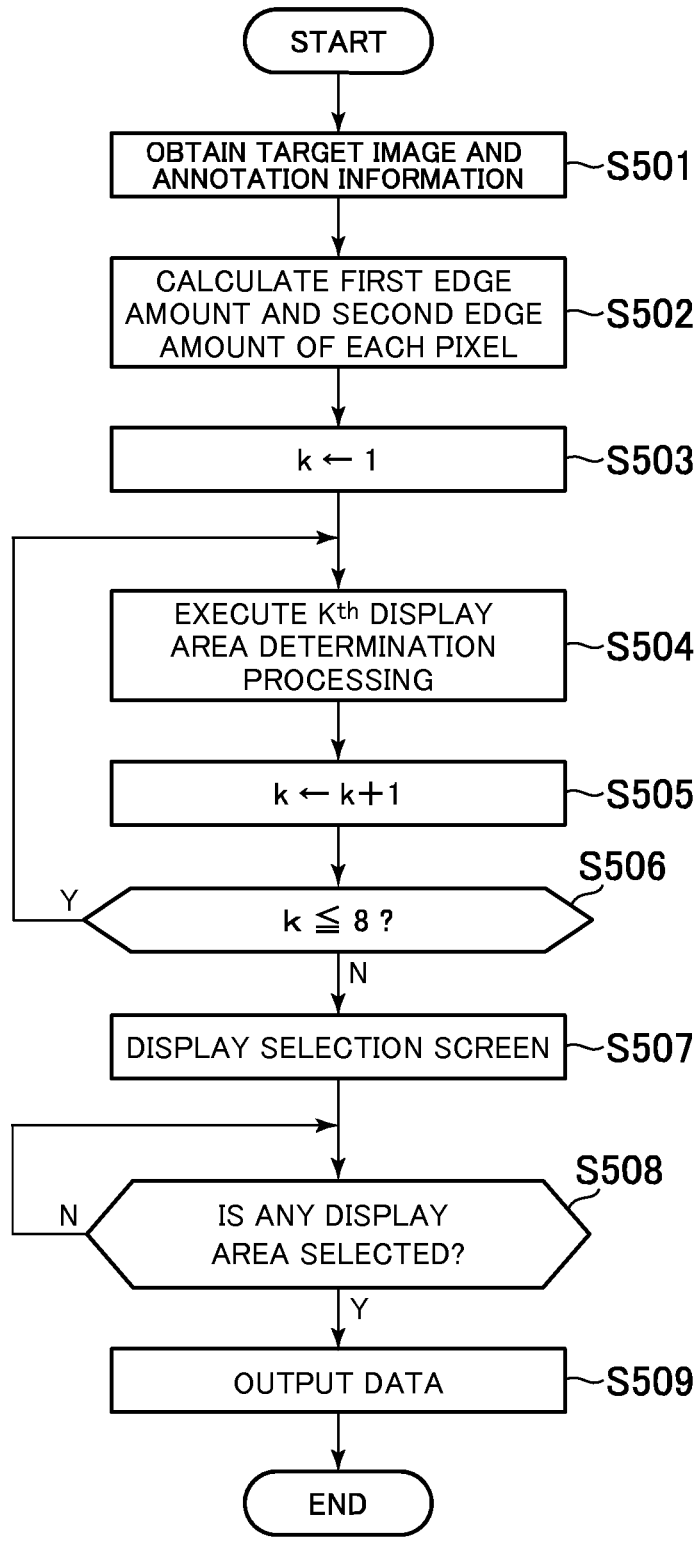
FIG. 21 is a flowchart showing another example of processing executed in the image processing device.

As shown in FIG. 21, initially, the control unit 11 obtains a target image and annotation information from the database 20 (S501). Further, the control unit 11 calculates the first edge amount and the second edge amount of each pixel in the target image (S502). The processing of step S502 is similar to that of step S402 in FIG. 20.

Thereafter, the control unit 11 initializes the variable k to one (S503). Then, the control unit 11 executes $k^{th}$ display area determination processing to thereby obtain a $k^{th}$ display area (S504). The content of the processing of this step S504 is basically similar to those of steps S103 and S104 shown in FIG. 11. In this case, however, an edge amount corresponding to the $k^{th}$ display area determination processing is used as the edge amount. Further, a calculation method corresponding to the $k^{th}$ display area determination processing is used as a calculation method of the evaluation value.

For example, as the first display area determination processing is executed when the value of the variable k is "1", the first edge amount based on the color phase is used (see FIG. 18). Further, the total value T calculated using the expression (6) mentioned above is used as the evaluation value E of the characteristic area candidate 50 or the display area candidate 70 (see FIG. 18).

After execution of the processing of step S504, the control unit 11 adds one to the variable k (S505). Then, the control unit 11 determines whether or not the variable k is equal to or less than eight (S506). Here, "eight" indicates the total number of the kinds of the display area determination processing.

When the variable k is equal to or less than eight, the control unit 11 executes again the processing of step S504. Meanwhile, when the variable k is not equal to or less than eight, the control unit 11 displays a selection screen on the display unit 16 (S507). On this selection screen, first to eight display areas obtained through the first to eighth display area determination processing are presented to the user.

When the selection screen is displayed, the control unit 11 receives a selection by the user. That is, the control unit 11 monitors whether or not any of the first to eighth display areas has been selected by the user (S508).

When any of the first to eighth display areas has been selected by the user, the control unit 11 outputs data on the target image with the annotation information displayed in the display area selected by the user (S509). For example, the control unit 11 displays the above mentioned data on the display unit 16. Further, for example, the control unit 11 outputs (stores) the above mentioned data to the storage unit or the database 20. With the above, description on the processing shown in FIG. 21 is finished.

Using the image processing device 10 according to the ninth embodiment described above, a user can select a desired display area from among a plurality of display areas obtained based on a plurality of display area determination processing.

Note that in the image processing device 10 according to the ninth embodiment, the display area obtained through the display area determination processing in accordance with the characteristic (the distribution pattern of the edge amount) of the target image among the first to eight display areas may be displayed with priority or distinctively on the selection screen displayed at step S507.

Here, "display area determination processing in accordance with the characteristic of the target image" refers to display determination processing associated with the distribution pattern information indicating the distribution pattern of the edge amount of the target image. For example, when the distribution pattern of the edge amount of the target image corresponds to the distribution pattern indicated by the third distribution pattern information, the third display area determination processing corresponds to the "display area determination processing in accordance with the characteristic of the target image".

As a method for displaying a display area with priority, various methods can be employed. For example, in displaying, with priority, a third display area obtained through the third display area determination processing on the selection screen, the selection screen may be displayed with the third display area selected in advance. Alternatively, in displaying the first to eighth display areas on the selection screen in a display order in accordance with the order information, the order of the third display area may be set to first.

As a method for displaying a display area distinctively, various methods can be employed. For example, in displaying, distinctively, a third display area obtained through the third display area determination processing on the selection screen, the third display area may be displayed on the selection screen in a display manner different from those for the other display areas. Alternatively, a predetermined image (for example, a frame image, a balloon image, a star image, or the like) may be displayed so as to be associated with the third display area only, so that the third display area is displayed distinctively from the other display areas.

With the above described setting, the display area obtained based on the display area determination processing in accordance with the characteristic (the distribution pattern of the edge amount) of a target image is displayed with priority or displayed distinctively on the selection screen. As a result, it can be configured that a user can readily select the display area obtained based on display area determination processing in accordance with the characteristic (the distribution pattern of the edge amount) of the target image.

Further, in the image processing device 10 according to the ninth embodiment, the display area determination processing data may be updated, based on the result of selection performed by a user on the selection screen. In the following, a configuration for updating the display area determination processing data as above will be described.

In this modified example, selection result data as is shown in FIG. 22, for example, is stored in the storage unit 12 (or the database 20). In the selection result data shown in FIG. 22, the distribution pattern information of the edge amount is associated with the selection result information. Note that the "distribution pattern information of the edge amount" is similar to that in FIG. 19.

"Selection result information" indicates the number of times the first to eighth display areas have been selected. In the selection result data shown in FIG. 22, selection result information associated with the first distribution pattern information indicates the number of times a user has selected each of the first to eighth display areas on the selection screen when the distribution pattern of the edge amount of the target image corresponds to the distribution pattern indicated by the first distribution pattern. This is similarly applied to the selection result information associated with the second to eighth distribution pattern information.

Figure 23:
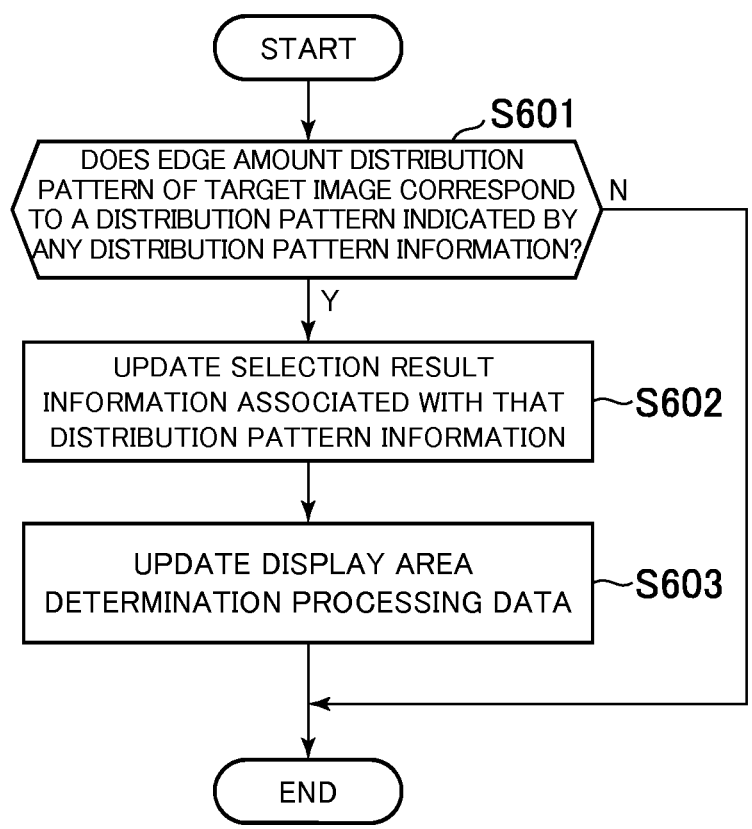
FIG. 23 is a flowchart showing another example of processing executed in the image processing device.

Further, in this modified example, when it is determined at step S508 in FIG. 21 that one of the display areas has been selected, the control unit 11 executes the processing shown in FIG. 23.

That is, the control unit 11 determines whether or not the distribution pattern of the edge amount of the target image corresponds to a distribution pattern indicated by any of the first to eighth distribution pattern information (S601). The processing of this step S601 is similar to that of step S403 in FIG. 20.

When it is determined that the distribution pattern of the edge amount of the target image corresponds to a distribution pattern indicated by any of the first to eighth distribution pattern information, the control unit 11 updates the selection result information associated with the distribution pattern information (S602). For example, when the display area selected by the user on the selection screen is the first display area and it is determined at step S601 that the distribution pattern of the edge amount of the target image corresponds to the distribution pattern indicated by the fourth distribution pattern information, the control unit 11 increases "the number of times the first display area is selected" associated with the fourth distribution pattern information by one.

After execution of the processing of step S602, the control unit 11 updates the display area determination processing data, based on the selection result data (S603).

For example, in the example shown in FIG. 22, as a display area selected the largest number of times is the eighth display area in the case where the distribution pattern of the edge amount of the target image corresponds to the distribution pattern indicated by the seventh distribution pattern information, the control unit 11 updates the display area determination processing data such that the display area determination processing associated with the seventh distribution pattern information becomes the display area determination processing corresponding to the eighth display area (that is, the eighth display area determination processing).

Further, in the example shown in FIG. 22, for example, as a display area selected the largest number of times is the seventh display area in the case where the distribution pattern of the edge amount of the target image corresponds to the distribution pattern indicated by the eighth distribution pattern information, the control unit 11 updates the display area determination processing data such that the display area determination processing associated with the eighth distribution pattern information becomes the display area determination processing corresponding to the seventh display area (that is, the seventh display area determination processing).

Note that when it is determined at step S601 that the distribution pattern of the edge amount of the target image does not correspond to a distribution pattern indicated by any of the first to eighth distribution pattern information, the control unit 11 ends this processing without executing the processing of steps S602 and S603. With the above, description on the processing shown in FIG. 23 is finished.

With the above described setting, it is possible to reconsider the association between the distribution pattern of the edge amount of an image and the display area determination processing in consideration of a result of selection by a user.

Note that the present invention is not limited to the above described first to ninth embodiments.

For example, although it is assumed that the food image posted by a poster is stored in the database 20 in the above description, the image stored in the database 20 is not limited to the food image 30. The present invention can be applied to a case in which annotation information is displayed in an image other than the food image 30.

The invention claimed is:

1. An image processing device, comprising:
a first area setting unit that sets, within a target image, a plurality of first areas for specifying a characteristic area of the target image;
a first calculation unit that calculates, as to each of the plurality of first areas, a total value of edge amounts of pixels within the first area;
a characteristic area detection unit that specifies the characteristic area, based on the total value of each of the plurality of first areas;
a second area setting unit that sets, within the target image, a plurality of second areas for determining a display area of annotation information;
a second calculation unit that calculates, as to each of the plurality of second areas, a total value of edge amounts of pixels within the second area; and
an annotation information display area determination unit that determines the display area of the annotation information, based on the total value of each of the plurality of second areas and the characteristic area.

2. The image processing device according to claim 1, wherein
the annotation information display area determination unit determines one of the second areas, which are positioned outside the characteristic area, to be the display area of the annotation information, based on the total value of each of the second areas positioned outside the characteristic area.

3. The image processing device according to claim 2, wherein
the annotation information display area determination unit determines one of the second areas, which has a smallest total value among the second areas positioned outside the characteristic area, to be the display area of the annotation information.

4. The image processing device according to claim 2, wherein
the annotation information display area determination unit determines one of the second areas, which are positioned outside the characteristic area and have a total value less than a reference value, to be the display area of the annotation information.

5. The image processing device according to claim 1, wherein
the annotation information display area determination unit determines one of the second areas, which are positioned within the characteristic area, to be the display area of the annotation information, based on the total values of each of the second areas positioned within the characteristic area.

6. The image processing device according to claim 5, wherein
the annotation information display area determination unit determines one of the second areas, which has a smallest total value among the second areas positioned within the characteristic area, to be the display area of the annotation information.

7. The image processing device according to claim 5, wherein
the annotation information display area determination unit determines one of the second areas, which are positioned within the characteristic area and have a total value less than a reference value, to be the display area of the annotation information.

8. The image processing device according to claim 5, further comprising:
a unit that obtains a cropped image obtained by cropping the characteristic area, and
a unit that outputs data on the cropped image with the annotation information displayed in the determined display area.

9. The image processing device according to claim 1, wherein
the annotation information display area determination unit determines the display area of the annotation information, based on the total value of each of the plurality of second areas and a distance between the second area and a representative point or a boundary of the characteristic area.

10. The image processing device according to claim 9, wherein
the annotation information display area determination unit determines one of the second areas, which has a shortest distance among a subset of the second areas whose total value is less than a reference value, to be the display area of the annotation information.

11. The image processing device according to claim 9, wherein
the annotation information display area determination unit determines one of the second areas, which have a total value less than a reference value and a distance shorter than a reference distance, to be the display area of the annotation information.

12. The image processing device according to claim 1, wherein
the annotation information display area determination unit determines the display area of the annotation information, based on the total value of each of the plurality of second areas, the characteristic area, and a combination of color information of the second area and display color information of the annotation information.

13. The image processing device according to claim 1, further comprising:
a unit that calculates, as to each of the plurality of second areas, a divided value or a multiplicative inverse thereof, the divided value being obtained by dividing the total value of the second area by a total value of edge amounts of pixels in at least one boundary portion of the second area, wherein the annotation information display area determination unit determines the display area of the annotation information, based on the divided value of each of the plurality of second areas or the multiplicative inverse thereof and the characteristic area.

14. The image processing device according to claim 1, wherein the second calculation unit calculates a weighted total value of the edge amounts of the pixels in the second area as the total value of the edge amounts of the pixels in the second area, and the second calculation unit sets a weight for an edge amount of a pixel in a middle portion of the second area higher than a weight for an edge amount of a pixel in a boundary portion of the second area.

15. The image processing device according to claim 1, wherein the edge amount is an amount relevant to a difference in brightness between a first pixel and a second pixel located around the first pixel.

16. The image processing device according to claim 1, wherein the edge amount is an amount relevant to a difference in color phase between a first pixel and a second pixel located around the first pixel.

17. The image processing device according to claim 1, wherein based on association data obtained by associating distribution pattern information concerning a distribution pattern of an edge amount of an image with each of a plurality of kinds of display area determination processing for determining the display area of the annotation information, the annotation information display area determination unit executes determination of the display area of the annotation information based on the total value of each of the plurality of second areas, through display area determination processing associated with a distribution pattern of an edge amount of the target image.

18. The image processing device according to claim 17, wherein the second calculation unit comprises:
 a unit that calculates, as to each of the plurality of second areas, a total value of first edge amounts of the pixels within the second area as a first total value, and
 a unit that calculates, as to each of the plurality of second areas, a total value of second edge amounts of the pixels within the second area as a second total value, the first edge amount is an amount relevant to a difference in color phase between a first pixel and a second pixel located around the first pixel, the second edge amount is an amount relevant to a difference in brightness between the first pixel and the second pixel, and the plurality of kinds of display area determination processing comprises:
 display area determination processing for determining the display area of the annotation information, based on the first total value of each of the plurality of second areas, and
 display area determination processing for determining the display area of the annotation information, based on the second total value of each of the plurality of second areas.

19. The image processing device according to claim 1, wherein the first area setting unit moves an area vertically and/or horizontally within the target image to thereby set the plurality of first areas, and the second area setting unit moves an area vertically and/or horizontally within the target image to thereby set the plurality of second areas.

20. An image processing device control method, comprising:

setting, within a target image, a plurality of first areas for specifying a characteristic area of the target image;

calculating, as to each of the plurality of first areas, a total value of edge amounts of pixels within the first area;

specifying the characteristic area, based on the total value of each of the plurality of first areas;

setting, within the target image, a plurality of second areas for determining a display area of annotation information;

calculating, as to each of the plurality of second areas, a total value of edge amounts of pixels within the second area; and determining the display area of the annotation information, based on the total value of each of the plurality of second areas and the characteristic area.

21. A non-transitory computer readable information storage medium storing a program for causing a computer to:

set, within a target image, a plurality of first areas for specifying a characteristic area of the target image;

calculate, as to each of the plurality of first areas, a total value of edge amounts of pixels within the first area;

specify the characteristic area, based on the total value of each of the plurality of first areas;

set, within the target image, a plurality of second areas for determining a display area of annotation information;

calculate, as to each of the plurality of second areas, a total value of edge amounts of pixels within the second area; and determine the display area of the annotation information, based on the total value of each of the plurality of second areas and the characteristic area.

* * * * *